US012812406B2

(12) United States Patent
Thangarasa et al.

(10) Patent No.: US 12,812,406 B2
(45) Date of Patent: Nov. 24, 2026

(54) METHOD FOR LOGGING COVERAGE ENHANCEMENT LEVEL CHANGE IN LOW COMPLEXITY USER EQUIPMENT

(71) Applicant: Telefonaktiebolaget LM Ericsson (PUBL), Stockholm (SE)

(72) Inventors: Santhan Thangarasa, Vällingby (SE); Ritesh Shreevastav, Upplands Väsby (SE); Muhammad Ali Kazmi, Sundbyberg (SE)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 736 days.

(21) Appl. No.: 17/995,597

(22) PCT Filed: Apr. 9, 2021

(86) PCT No.: PCT/EP2021/059250
§ 371 (c)(1),
(2) Date: Oct. 6, 2022

(87) PCT Pub. No.: WO2021/204977
PCT Pub. Date: Oct. 14, 2021

(65) Prior Publication Data
US 2023/0092483 A1 Mar. 23, 2023

Related U.S. Application Data

(60) Provisional application No. 63/007,409, filed on Apr. 9, 2020.

(51) Int. Cl.
*H04W 24/02* (2009.01)
*H04W 24/10* (2009.01)

(52) U.S. Cl.
CPC .......... *H04W 24/02* (2013.01); *H04W 24/10* (2013.01)

(58) Field of Classification Search
CPC .............................. H04W 24/02; H04W 24/10
See application file for complete search history.

(56) References Cited

U.S. PATENT DOCUMENTS

2013/0010624 A1* 1/2013 He ...................... H04L 41/5067 370/252
2017/0374574 A1* 12/2017 Lee ....................... H04W 24/08
2021/0345144 A1* 11/2021 Yang ..................... H04W 24/10
2021/0352538 A1* 11/2021 Breuer ............. H04W 36/0058
(Continued)

FOREIGN PATENT DOCUMENTS

CN 110753324 A 2/2020

OTHER PUBLICATIONS

3GPP TSG-RAN WG2 Meeting #104; Spokane, US; Source: Gemalto N.V.; Title: ANR considerations for NB-IoT (R2-1816427)—Nov. 12-16, 2018.
(Continued)

*Primary Examiner* — Matthew D. Anderson
*Assistant Examiner* — Dung L Lam
(74) *Attorney, Agent, or Firm* — Baker Botts L.L.P.

(57) ABSTRACT

A method by a wireless device includes logging information associated with a coverage enhancement (CE) level of a cell. The information includes a carrier and a received signal quality and/or a received signal strength measured by the wireless device. The wireless device transmits the information associated with the CE level to a network node.

14 Claims, 13 Drawing Sheets

(56) References Cited

U.S. PATENT DOCUMENTS

| | | | | |
|---|---|---|---|---|
| 2022/0086673 | A1* | 3/2022 | Fujishiro | H04W 24/08 |
| 2023/0092483 | A1* | 3/2023 | Thangarasa | H04W 24/10 455/422.1 |

OTHER PUBLICATIONS

3GPP TSG-RAN WG2 #107bis; Chongqing, China; Title: ZTE Corporation, Sanechips; Title: Remaining FFSs for ANR report in NB-IoT (R2-1912895)—Oct. 14-18, 2019.

PCT International Search Report issued for International application No. PCT/EP2021/059250—Jul. 5, 2021.

PCT Written Opinoin of the International Searching Authority issued for International application No. PCT/EP2021/059250—Jul. 5, 2021.

3GPP TS 36.133 v16.4.0; Technical Specification; 3rd Generation Partnership Project; Technical Specification Group Radio Access Network; Evolved Universal Terrestrial Radio Access (E-UTRA); Requirements for support of radio resource management (Release 16) [due to size of document, this has been split into two parts]—Dec. 2019.

3GPP TS 36.213 v16.1.0; Technical Specification; 3rd Generation Partnership Project; Technical Specification Group Radio Access Network; Evolved Universal Terrestrial Radio Access (E-UTRA); Physical layer procedures (Release 16)—Mar. 2020.

* cited by examiner

METHOD FOR LOGGING COVERAGE ENHANCEMENT LEVEL CHANGE IN LOW COMPLEXITY USER EQUIPMENT

PRIORITY

This nonprovisional application is a U.S. National Stage Filing under 35 U.S.C. § 371 of International Patent Application Serial No. PCT/EP2021/059250 filed Apr. 9, 2021 and entitled "Method for Logging Coverage Enhancement Level Change in Low Complexity User Equipment" which claims priority to U.S. Provisional Patent Application No. 63/007,409 filed Apr. 9, 2020 both of which are hereby incorporated by reference in their entirety.

TECHNICAL FIELD

The present disclosure relates, in general, to wireless communications and, more particularly, systems and methods for logging Coverage Enhancement (CE) level change in a low complexity wireless device such as a user equipment (UE).

BACKGROUND

In Long Term Evolution (LTE) and wideband code division multiple access (WCDMA), the purpose of Automatic Neighbor Relation (ANR) is to identify new neighbour cells (nCells). Once the nCells are identified the knowledge can be used, for example, to enable handovers, for planning and optimization of Physical Cell Identities (PCI), and/or for Random Access Channel (RACH) configuration and interference co-ordination.

Minimization of drive test (MDT) is used as an alternative to the drive tests for obtaining certain types of user equipment (UE) measurements results for Self Organizing Network (SON) related features such as network planning, network optimization, network parameter tuning or setting (e.g. base station transmit power, number of receive and/or transmit antennas etc.), or even for positioning (e.g., Radio Frequency (RF) pattern matching based positioning). The UE is configured by the network for logging the measurements. Two MDT modes exist: immediate MDT and logged MDT. These are as follows:

Immediate MDT comprising measurement performed by UE in the high Radio Resource Control (RRC) activity states (e.g. RRC CONNECTED state in LTE and New Radio (NR), etc.) and the reporting of the measurements to a network node such as, for example, a eNodeB (eNB), gNodeB (gNB), or other network node, when a reporting condition is met (e.g., the reporting event is triggered).

Logged MDT functionality comprising measurement performed by UE when operating in a low RRC activity state (e.g. RRC idle, RRC inactive, etc.). The network uses Logged Measurement Configuration message to configure the UE to perform logging of measurement results in low RRC activity state which can be stored in the UE for up to 48 hours before reporting. The configuration comprises information such as absolute time in the cell, logging duration, logging interval or periodicity (e.g. how often the measurements are logged), information about area where logging is required etc. The logging duration can vary from few minutes to several hours. The UE transmits the measurement results along with relative time stamp for each log, which indicates the time of logging measurement results relative to the absolute time received (received from the network), location information of the logged results (optional) etc.

In Rel-16, Automatic Neighbor Relations (ANR) is being defined in 3$^{rd}$ Generation Partnership Project (3GPP) for Narrowband-Internet of Things (NB-IoT). For ANR, UE in idle mode would perform strong cell detection and identification measurements using cell reselection measurements defined in 3GPP TS 36.133. UE shall read and store the Cell Global Identity (CGI) of the strongest cell.

Below captures the detail Network broadcast info regarding the Coverage Enhancement (CE) level thresholds. For simplification, only the relevant Information Elements (IEs) and fields have been shown.

SystemInformationBlockType2 information element

```
-- ASN1START
SystemInformationBlockType2 ::=            SEQUENCE {
  radioResourceConfigCommon                RadioResourceConfigCommonSIB
}
RadioResourceConfigCommonSIB ::=           SEQUENCE {
  prach-ConfigCommon-v1310                 PRACH-ConfigSIB-v1310,
    rach-ConfigCommon                      RACH-ConfigCommon
}
PRACH-ConfigSIB-v1310 ::=                  SEQUENCE {
  rsrp-ThresholdsPrachInfoList-r13            RSRP-
ThresholdsPrachInfoList-r13,
  prach-ParametersListCE-r13               PRACH-ParametersListCE-r13
}
RSRP-ThresholdsPrachInfoList-r13 ::= SEQUENCE (SIZE(1..3)) OF
RSRP-Range
PRACH-ParametersListCE-r13 ::=             SEQUENCE (SIZE(1..maxCE-Level-
r13)) OF PRACH-ParametersCE-r13
RACH-ConfigCommon ::=  SEQUENCE {
RACH-CE-LevelInfoList-r13 ::=              SEQUENCE (SIZE (1..maxCE-Level-
r13)) OF RACH-CE-LevelInfo-r13
RACH-CE-LevelInfo-r13 ::=                  SEQUENCE {
  preambleMappingInfo-r13                  SEQUENCE {
      firstPreamble-r13                    INTEGER(0..63),
      lastPreamble-r13                     INTEGER(0..63)
  },
}
```

The criterion for BL UEs and UEs in Coverage Enhancement (CE) to select Physical Random Access Channel (PRACH) resource set. Up to 3 reference signal received power (RSRP) threshold values are signalled to determine the CE level for PRACH. See, 3GPP TS 36.213. The first element corresponds to RSRP threshold 1, the second element corresponds to RSRP threshold 2 and so on. See, 3GPP TS 36.321. The UE shall ignore this field if only one CE level, i.e. CE level 0, is configured in prach ParametersListCE. The number of RSRP thresholds present in rsrp-ThresholdsPrachInfoList is equal to the number of CE levels configured in prach ParametersListCE minus one.

A UE that supports powerClass-14 dBm shall correct the RSRP threshold values before applying them as follows:

RSRP threshold=Signalled RSRP threshold−min{0, (14-min(23,*P*-Max))} where *P*-Max is the value of *p*-Max field in For NB-IoT, the relevant information is provided in SysteminformationBlockType2-NB.

Certain problems exist, however. For example, a low complexity, power limited UE may operate in different coverage enhancement levels such as, for example, normal coverage, enhanced coverage, etc. The radio resources (e.g. number of repetition of signals, antennas, transmit power, etc.) required to serve the UE in different CE levels vary significantly. For example, a larger number of repetitions is needed at an enhanced CE level than in normal CE level. The UE's CE level may also change over time. Therefore, network has to adapt its radio resources for serving different UEs in a cell. It is, therefore, important for the network to plan and optimize the resources especially at higher load. The low complexity UE (e.g., MTC, NB-IoT etc.) can potentially be located at a location not accessible for an operator to determine for example the resources for allocation e.g. through simple drive tests. A mechanism is needed to allow an operator to optimize and tune its radio resources so that the UE can be served regardless of their CE level in a cell.

SUMMARY

Certain aspects of the present disclosure and their embodiments may provide solutions to these or other challenges.

According to certain embodiments, a method by a wireless device includes logging information associated with a CE level of a cell. The information includes a carrier and a received signal quality and/or a received signal strength measured by the wireless device. The wireless device transmits the information associated with the CE level to a network node.

According to certain embodiments, a wireless device includes processing circuitry configured to log information associated with a CE level of a cell. The information includes a carrier and a received signal quality and/or a received signal strength measured by the wireless device. The processing circuitry is configured to transmit the information associated with the CE level to a network node.

According to certain embodiments, a method by a network node includes providing a wireless device with a configuration comprising one or more parameters for logging information associated with a CE level. The network node receives the information associated with the CE level from the wireless device, and the information includes a carrier and a received signal quality and/or a received signal strength measured by the wireless device. The network node uses the information when performing at least one operational task.

According to certain embodiments, a network node includes processing circuitry configured to provide a wireless device with a configuration comprising one or more parameters for logging information associated with a CE level. The processing circuitry is configured to receive the information associated with the CE level from the wireless device, and the information includes a carrier and a received signal quality and/or a received signal strength measured by the wireless device. The processing circuitry is configured to use the information when performing at least one operational task.

Certain embodiments may provide one or more of the following technical advantages. For example, one technical advantage may be that certain embodiments enable a network and/or operator to obtain more accurate information about the actual coverage levels as experienced by the UE. As another example, one technical advantage may be that certain embodiments enable a network to use the reported logged information for adapting the CE level thresholds in the cells. As still another example, one technical advantage may be that the network can use the reported logged information for optimizing the network parameters. As yet another example, a technical advantage may be that certain embodiments enable the network to enhance and improve the efficiency of radio resources.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
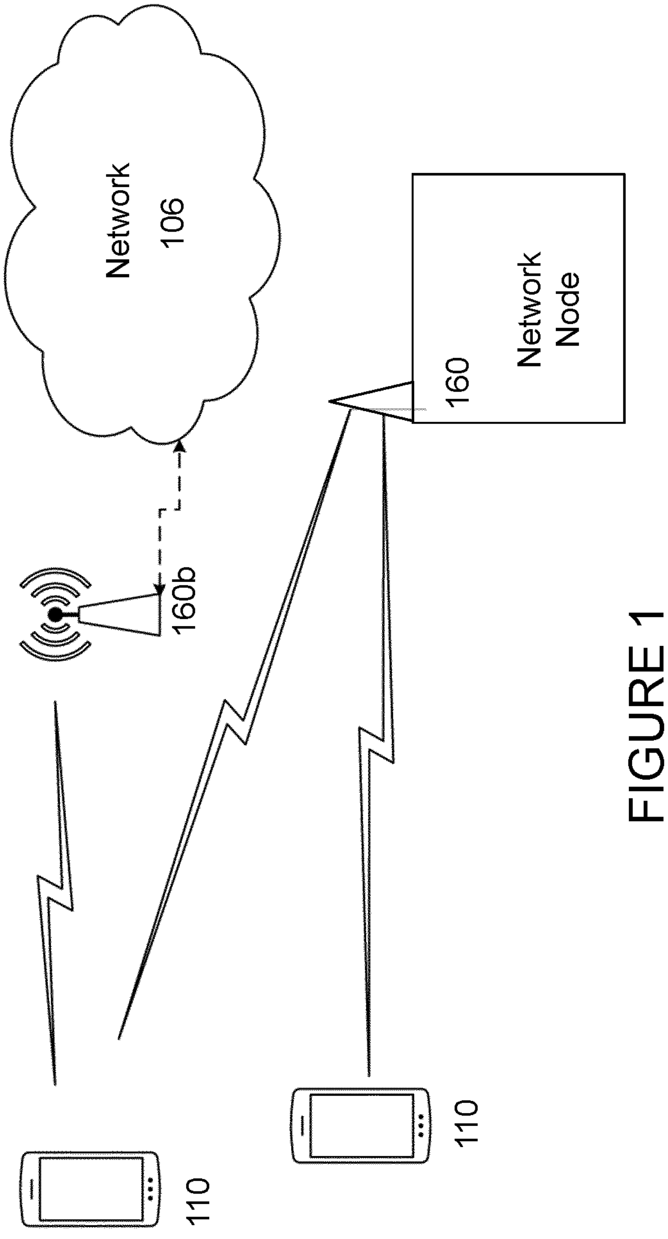
FIG. 1 illustrates an example wireless network, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNodeB (MeNB), a network node belonging to a Master Cell Group (MCG) or Secondary Cell Group (SCG), base station (BS), multi-standard radio (MSR) radio node such as MSR base station (MSR BS), eNodeB, gNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. MSC, Mobility Management Entity (MME), etc.), Operations & Maintenance (O&M), Operations Support System (OSS), Self Optimizing Network (SON), positioning node (e.g. evolved Serving Mobile Location Center (E-SMLC)), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Data Assistant (PDA), Tablet, mobile terminals, smart phone, laptop embedded equipped (LEE), laptop mounted equipment (LME), Unified Serial Bus (USB) dongles, UE category M1, UE category M2, Proximity Services UE (ProSe UE), Vehicle-to-vehicle (V2V) UE, Vehicle-to-Anything (V2X) UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

The term "radio node" may refer to radio network node or UE capable of transmitting radio signals or receiving radio signals or both.

The term time resource used herein may correspond to any type of physical resource or radio resource expressed in terms of length of time or time interval or time duration. Examples of time resources are: symbol, mini-slot, time slot, subframe, radio frame, Transmission Time Interval (TTI), interleaving time, etc.

The term TTI used herein may correspond to any time period over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

The UE performs measurements on reference signal (RS). Examples of RS are Synchronization Signal Block (SSB), Channel State Information-Reference Signal (CSI-RS), Cell Reference Signal (CRS), Network Reference Signal (NRS), Demodulation Reference Signal (DMRS), Primary Synchronization Signal (PSS), Secondary Synchronization Signal (SSS), Narrowband Primary Synchronization Signal (NPSS), Narrowband secondary Synchronization Signal (NSSS), etc. Examples of measurements are cell identification (e.g. Physical Cell Identifier (PCI) acquisition, cell detection), Reference Signal Received Power (RSRP), Reference Signal Received Quality (RSRQ), secondary synchronization RSRP (SS-RSRP), narrowband RSRP (NRSRP), narrowband RSRQ (NRSRQ), Synchronization Signal-Reference Signal Received Power (SS-RSRQ), Signal Interference to Noise Ratio (SINR), Reference Signal-Signal Interference to Noise Ratio (RS-SINR), Synchronization Signal-Signal Interference to Noise Ratio (SS-SINR), Channel State Information-Reference Signal Received Power (CSI-RSRP), Channel State Information-Reference Signal Received Power CSI-RSRQ, acquisition of system information (SI), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used for scheduling, link adaptation etc. by network. Examples of CSI measurements or CSI reports are Channel Quality Indicator (CQI), Precoding Matrix Indicator (PMI), RI etc. They may be performed on reference signals like CRS, CSI-RS or DMRS.

CGI is transmitted in SIB1 or SIB1-NB in NB-IoT. To acquire CGI, the UE needs to acquire MIB and SIB1. For example, for NB-IoT, the UE may acquire MIB-NB and SIB1-NB. MIB or MIB-NB is transmitted on the PBCH or NPBCH channel while SIB1 or SIB1-NB is multiplexed into PDSCH or NPDSCH channel. MIB is transmitted in subframe #0 with a periodicity of 40 ms and 4 redundancy versions are transmitted within this period. MIB-NB is transmitted in subframe #0 with a periodicity of 640 ms and 10 redundancy versions are transmitted within this period. SIB1 is transmitted on subframe #5 and it has a periodicity of 80 ms. SIB1-NB is transmitted on subframe #5 and it has a periodicity of 160 ms.

The coverage enhancement (CE) level of the UE used herein is also interchangeably called as coverage level of the UE. The CE level can be expressed in terms of:

- received signal quality and/or received signal strength at the UE with regard to a cell and/or
- received signal quality and/or received signal strength at a cell with regard to the UE.

According to certain embodiments, the CE level of the UE may be defined with respect to any cell such as serving cell, a neighbor cell, a reference cell, etc. For example, it can be expressed in terms of received signal quality and/or received signal strength at the UE with regard to a target cell on which the UE performs one or more radio measurements. Examples of signal quality are Signal to Noise Ratio (SNR), SINR, CQI, NRSRQ, RSRQ, CRS Ês/lot, SCH Ês/lot, NSCH Ês/lot etc. Examples of signal strength are path loss, coupling loss, RSRP, NRSRP, SCH RP, NSCH RP etc. The notation Ês/lot is defined as ratio of:

- Ês, which is the received energy per RE (power normalized to the subcarrier spacing) during the useful part of the symbol, i.e. excluding the cyclic prefix, at the UE antenna connector, to
- Iot which is the received power spectral density of the total noise and interference for a certain RE (power integrated over the RE and normalized to the subcarrier spacing) as measured at the UE antenna connector According to certain embodiments, the CE level can be expressed in at least two different levels. Consider an example of two different CE levels defined with regard to signal quality (e.g. SNR) at the UE comprising of:

- Coverage enhancement level 1 (CE1) comprising of SNR≥−6 dB at UE with regard to a cell; and
- Coverage enhancement level 2 (CE2) comprising of −15 dB≤SNR<−6 dB at UE with regard to a cell.

In the above example, the CE1 may also be interchangeably called as normal coverage level (NCL), baseline coverage level, reference coverage level, basic coverage level, legacy coverage level etc. On the other hand, CE2 may be termed as enhanced coverage level or extended coverage level (ECL).

According to certain embodiments, the two different coverage levels (e.g. normal coverage and enhanced coverage) may be defined in terms of signal quality levels as follows:

- The requirements for normal coverage are applicable for the UE category NB1 or NB2 with regard to a cell provided that radio conditions of the UE with respect to that cell are defined as follows NSCH Ês/Iot≥−6 dB and NRS Ês/Iot≥−6.
- The requirements for enhanced coverage are applicable for the UE category NB1 or NB2 with regard to a cell provided that radio conditions of the UE with respect to that cell are defined as follows NSCH Ês/Iot≥−15 dB and NRS Ês/Iot≥−15.

According to certain embodiments, one or more parameters defining CE of the UE with respect to a cell (e.g. serving cell, neighbour cell etc) may also be signalled to the UE by the network node. Examples of such parameters are CE Mode A and CE Mode B signalled to UE category M1, UE category M2 etc. The UE configured with CE Mode A and CE Mode B are also said to operate in normal coverage and enhanced coverage respectively. For example:

- The requirements for CE Mode A apply provided the UE category M1 or UE category M2 is configured with CE Mode A, SCH Ês/Iot≥−6 dB and CRS Ês/Iot≥−6 dB.
- The requirements for CE Mode B shall apply provided the UE category M1 or UE category M2 is configured with CE Mode B, SCH Ês/Iot≥−15 dB and CRS Ês/Iot≥−15 dB.

According to certain other embodiments, the UE may also determine the CE level with regard to a cell (e.g. serving cell etc.) during the random access transmission procedure to that cell. For example, the UE may determine the CE level during cell change procedure or for establishing connection. Examples of such procedures are cell selection, handover, cell reselection, RRC release with redirection, RRC connection re-establishment et). The transmission parameters (e.g. for PRACH in MTC or NPRACH in NB-IoT) used for uplink transmission are associated with a CE level. The UE uses the estimated CE level for selecting the transmission parameters for uplink transmission. For example, the UE may select the random access transmission resources (e.g. repetition level of RA channels) that are associated with different CE levels (e.g. PRACH CE level 0, CE level 1, CE level 2 etc.) based on the received signal level (e.g. RSRP, NRSRP etc.). The UE may select or determine the CE level (e.g. PRACH CE level) based on the signal measurement results performed by the UE (e.g. RSRP, NRSRP, path loss).

In general, the UE operating with larger CE level is capable of operating under received signal level (e.g. RSRP, NRSRP, path loss, SNR, SINR, Ês/Iot, RSRQ, NRSRQ etc.) lower than the received signal level under smaller CE level. The embodiments described herein are applicable for any number of CE levels of the UE with regard to a cell e.g. CE1, CE2, CE3, CE4 etc. In this example CE1 corresponds to smallest CE level while CE2 corresponds to larger CE level with regard to CE1 but smaller with regard to CE3 and CE3 corresponds to larger CE level with regard to CE2 but smaller with regard to CE4 and so on.

According to certain embodiments, a method is performed in a UE. According to the method, the UE is configured to log information related to CE level, which may comprise an identifier of a CE level and/or CE level change in a cell (e.g. serving cell), and to use the logged information for one or more operational tasks such as, for example, reporting the logged information to a network node (e.g. serving eNodeB), using the logged information for adapting the UE's transceiver parameters etc. According to certain embodiments, the logged information comprises at least:

- Configured number of CE levels and/or associated thresholds used by the UE for deriving the CE level,
- CE level and/or changes in CE levels at the time of logging,
- Logging time such as, for example, relative time compared to a reference time,
- Cell ID of the cell where the CE level change occurred or where the CE level was logged According to certain embodiments, the logged information may further comprise one or more of the following:

- One or more parameters used by the UE for deriving CE level e.g. measurement threshold that was used by the UE for triggering the change in CE level Time spent (or percentage of time) in a CE level before CE level change occurred Location information when the CE level change occurred The UE may log the CE level related information in a cell when certain condition or event or procedure is triggered or performed by the UE. Examples of such procedures are: when doing certain type of measurement in the cell (e.g. when doing or logging ANR measurement in the cell (e.g. acquiring or logging CGI of the cell), when acquiring SI of the cell for cell reselection to that cell (e.g. during or after doing the cell reselection to the cell), etc. The logged information about the CE level change events are stored in the UE for a certain pre-defined time (e.g. N hours) and reported when the UE switches to high RRC activity states such as, for example, in an RRC connected state.

According to certain embodiments, a method performed in a network node (e.g. eNB) includes the network node configuring the UE with one or more parameters for enabling the UE to log the CE level related information, receiving the logged information related to CE level from the UE, and using it for one or more operational tasks such as, for example, for adapting one or more settings/configurations in its deployment or adapting one or more of its procedures, and signaling the adapted information to the UE. Examples of the configurations include the PRACH configurations such as measurement thresholds which are used for determining the CE level, adapting one or more transmit power of the network node to adapt the cell size.

In an example scenario, a UE is served by a first cell (cell1) on a first carrier (F1). Celli is managed or served or operated by a first network node (NW1) such as, for example, a base station. The UE may further be configured to perform one or more measurements on one or more neighbor cells such as, for example, a second cell (cell2), which may operate on F1 or on a second carrier (F2). Cell 1 may be operated by NW1 or by another network node e.g. a second network node (NW2). The UE operates in a certain coverage enhancement (CE) level with regard to a certain cell e.g. CE level X1 with regard to cell1, cell level X2 with regard to cell2 and so on, where at any given time CE level X1 and CE level X2 may be the same or they may be different. The UE is configured to receive signals (e.g. paging, WUS, NPDSCH, NPDCCH, MPDCCH, PDSCH etc.) from at least cell1. The UE serving cell may change over time e.g. from cell1 to cell2 or from cell1 to another cell e.g. a third cell (cell3).

According to certain embodiments, the UE may be further configured by NW1 to log information related to CE level with regard to one or more cells such as, for example, CE level with regard to serving cell (e.g. cell1), CE level with regard to reference cell (e.g. strongest cell, strongest neighbor cell, cell whose CGI is to be determined by the UE etc.), CE level on one or more cells of one or more carrier frequencies such as for example, F1, F2, etc.

According to certain embodiments, the UE may log information about the CE level when one or more conditions is met. For example, the UE may log information when a certain event is triggered in the UE on a cell such as, for example, a cell of F1 or F2 etc. In one example embodiment, the event is triggered when the UE has fulfilled the conditions for selecting a CE level which is different from the current CE level (e.g. the last CE level determined by the UE). In another particular embodiment, the event is triggered when the UE has performed certain type of measurement on a cell e.g. when UE has acquired the SI of a target cell (e.g. cell2).

Method in UE of Logging CE Level Related Information

According to certain embodiments, the UE may be configured to log information related to at least a CE level of the UE with respect to one or more cells. The information related to the CE level to be logged by the UE may comprise one or more of the following:

An identifier of CE level e.g. CE level 0, CE level 1 etc.

Change in CE level with regard to a reference CE level. Examples of reference CE level are specific CE level (e.g. CE level 0), the last CE level determined by the UE, CE level in certain cell e.g. cell1. The logged information may contain information about the current (old) CE level (CEx), new/target CE level (CEy), or both the current and the target CE levels.

One or more signal thresholds used by the UE for deriving the CE level in a cell such as, for example, RSRP thresholds signaled to the UE in the system information (e.g. in SIB2, SIB2-NB).

The configuration information may further comprise one or more events or conditions. Upon triggering of any such event or fulfilment of any of such condition or execution of such procedure or operation, the UE may be required to perform the logging or start the logging of CE level related information. Examples of such events or conditions are:

The CE level of the UE changes in a cell where the UE logs the CE level related information. Examples of such cells are serving cell (e.g. cell1), a neighbor cell belonging to a serving or non-serving carrier, strongest cell (with largest signal level) on a carrier etc.

Logging the CE level information of a target cell (e.g. cell2) when performing cell change operation or after doing the cell change e.g. from cell1 to cell2. For example, this can be done before, during or after the cell reselection procedure. The UE will acquire the SI of the target cell and may also read e.g. SIB2 or SIB2-NB (in NB-IoT) for cell reselection purposes. The UE can therefore acquire and log the CE level information.

The UE is triggered to perform certain type of measurement in a cell. The UE may trigger such measurement autonomously (e.g. when certain condition is met) or upon receiving a request from the network node (e.g. measurement configuration from positioning node. Examples of such measurements are:

ANR measurements performed by the UE e.g. acquisition of SI of a cell, acquisition of a CGI of a cell etc. For example the UE may be triggered to acquire the CGI of a neighbor cell on a carrier. As an example the neighbor cell may be the strongest cell on a carrier e.g. cell whose signal level is largest among all the cells on that carrier. The CE level information (e.g. CE level, signal thresholds etc.) is provided in SIB2 or SIB2-NB. The UE acquires SI beyond SIB 1 (e.g. SIB1) when reading SI of a cell which is candidate for cell reselection. If during ANR measurement (strongest cell detection and measurement) a cell happens to be the candidate cell for cell reselection, UE will then log the CE level for such cell (which is candidate for cell reselection or after performing the cell reselection to such cell. If the cell is not a candidate cell for cell reselection and only for ANR cell; UE may anyway read SIB2 of strongest cell to determine the CE level. This sort of UE may be associated with new capability to read not only the MIB and RBI but also the higher/other SI (SIB2) of the strongest cell. Further as the measurements are done in idle mode using the usual cell reselection measurement intervals, thus the power consumption to read SIB2 is not considered a limitation.

Positioning measurements performed by the UE e.g. RSTD, UE Rx-Tx time difference measurement etc. For example the UE is required to log the CE level in a cell when the UE is triggered (e.g. based on request from positioning node) to measure positioning measurement on signals of that cell. In yet another example the UE is required to log the CE level in a cell when the UE measures certain type of positioning measurement e.g. one related to critical services such as RSTD.

When UE performs a cell change e.g. from cell1 to cell2. The UE may be required to log the CE level related information in the old serving cell and/or new serving cell e.g. in cell1 and/or cell2.

When the UE signal level in a cell changes by more than certain margin e.g. RSRP changes by more than a threshold in the serving cell (e.g. cell1). In one example the UE logs the CE level information in a cell if signal level (e.g. RSRP) in that cell increases by more than certain threshold (H1) e.g. H1=10 dB. In another example the UE logs the CE level information in a cell if signal level (e.g. RSRP) in that cell decreases by more than certain threshold (H2) e.g. H2=8 dB. H1 and H2 can be pre-defined or configured by the network node. As special case H1=H2.

Periodically e.g. at regular time interval. For example the UE evaluates and determines the UE level once every T0 time period e.g. T0=N*DRX cycle, T0=N*periodicity of WUS signal etc.

According to certain embodiments, the UE may further be configured to log additional information about the logging time such as time instance (Tg) when the UE logs the CE level related information in a cell. The time instance, Tg, can be an absolute time (e.g. UTC time) and/or it can be a relative time or relative time stamp (Tg=ΔT) e.g. time with regard to reference time (Tr). For example Tr can be the absolute time in cell1 when the UE is configured by the network node to log the CE level related information in a cell. The may further be configured with a logging duration e.g. total duration over which the logging is to be done e.g. 60 minutes.

According to certain embodiments, the UE may further be configured to log additional information about the amount of time spent by the UE in certain CE level in a cell e.g. in CE level #1 in cell1. The amount of time can be expressed in terms of one or more parameters. Examples of such parameters are duration, relative duration with regard to a reference time (Tr), relative duration with regard to a total logging time (e.g. configured in the logging information), percentage of time spent in certain CE level with regard to reference time or total logging time etc.

According to certain embodiments, the UE may further be configured to log additional information such as location (e.g. geographical area such as geographical coordinates) at which the information is logged.

According to certain embodiments, in addition to the above information, the UE may also configured to log cell ID of the cell where the event is logged. For example, if the UE has evaluated and conditions for selecting a new CE level has been met, then the cell ID of that cell is logged. This means, the event is logged with the associated cell ID. The cell ID may comprise a physical cell ID and/or a unique or global cell ID (e.g. CGI) of the cell in which the CE level is logged by the UE.

According to certain embodiments, the UE may be configured to log information used by the UE for determining or estimating the CE level in a cell. The information to be logged may comprise one or more signal level thresholds signaled to the UE for deriving the CE level and/or measured signal level used by the UE for determining the CE level. For deriving the CE level the UE is configured by the network node with one or more signal thresholds (e.g. RSRP thresholds) associated with a cell e.g. cell1. The UE measures the signal level (e.g. RSRP) and compares it with one or more thresholds to determine the CE level of the UE with regard to that cell e.g. there can be N different CE levels for (N−1) thresholds e.g. 2 possible CE levels for one thresholds, 3 possible CE levels for one thresholds for 2 thresholds and so on. For example assume that the UE is configured with 2 thresholds (e.g. RSRP1=−80 dBm and RSRP2=−100 dBm). In one example the UE measured RSRP is −70 dBm and in this case the UE determines its CE level as CE level #0. In a second example the UE measured RSRP is 90 dBm and in this case the UE determines its CE level as CE level #1. In a third another example the UE measured RSRP is −110 dBm and in this case the UE determines its CE level as CE level #3. The UE may log its CE level (e.g. CE level #0 assuming RSRP−70 dBm as in first example) and it may also log the configured thresholds e.g. RSRP1=−80 dBm and RSRP2=−100 dBm. The UE may also log the measured RSRP e.g. −70 dBm in this example. This will enable the network node to determine the meaning of CE level logged by the UE e.g. in terms of the signal level.

According to certain embodiments, the UE may be configured to log information related to transmission configuration of signals associated with CE levels in a cell e.g. PRACH configuration parameters associated with the CE level determined by the UE.

According to certain embodiments, the UE may obtain the configuration for logging the CE level related information based on pre-defined information or by receiving a message (e.g. RRC message) from a network node.

According to certain embodiments, the UE may initiate the logging upon receiving logging configuration from the network node, e.g. from cell1. The logging may be performed in low activity RRC state e.g. in RRC idle state, in RRC inactive state etc. The UE logs one or more parameters related to the CE level as described above e.g. CE level, change in the CE level, parameters used for deriving the CE level, logging time, events or conditions under which the logging was done (e.g. upon acquiring CGI etc.) etc.

According to certain embodiments, the UE uses the logged information for one or more operational tasks. Examples of such tasks comprising transmitting the information to another node (e.g. to the network node, to another UE etc.), using the results for internal operational such as determining the type of requirements it is required to fulfill, selecting the CE level, adapting UE transceiver parameters for transmitting and/or receiving signals etc.

Certain of the embodiments described above will now be explained in further detail with some examples.

Logging Example #1

A general example is shown in Table 1 where the UE is configured to log CE level in a cell, and the logged information include: target CE level ($N_j$), relative time ($\Delta T_j$), and cell ID ($ID_j$). It is assumed that the UE can log up to N values of the CE level over the logging duration e.g. CE levels $N_1$, $N_2$, $N_3$, . . . , $N_N$ are logged at time instances $T_1$, $T_2$, $T_3$, . . . $T_N$ respectively. Therefore j≤N. The cell ID denotes the cell on which the CE level was logged. The relative time with regard to Tr for logging Nj is denoted as $\Delta T_j$. As an example $\Delta T_1=(T_1-Tr)$ e.g. $\Delta T_1=(T_1-Tr)$ and so on. As special case $\Delta T_1=\Delta T_2==\Delta T_N$ e.g. the logging period or interval may comprise L number of DRX cycle or it can be a fixed value.

TABLE 1

A general example of logged results associated with CE level information

| Logged results set (Sj) | CE level ($N_j$) | Relative time ($\Delta T_j$) | Cell ID ($ID_j$) |
|---|---|---|---|
| 1 | $N_1$ | $\Delta T_1$ | $ID_1$ |
| 2 | $N_2$ | $\Delta T_2$ | $ID_2$ |
| . . . | . . . | . . . | . . . |
| K | $N_K$ | $\Delta T_K$ | $ID_K$ |
| K + 1 | $N_{K+1}$ | $\Delta T_{K+1}$ | $ID_{K+1}$ |
| K + 2 | $N_{K+2}$ | $\Delta T_{K+2}$ | $ID_{K+2}$ |
| . . . | . . . | . . . | . . . |
| N | $N_N$ | $\Delta T_N$ | N |

Logging Example #2

Table 2 shows another general example where the UE is configured to log CE level in a cell, and also thresholds for deriving the CE level in that cell. The logged information includes: CE level ($N_j$), signal level threshold ($T_{ij}$), relative time ($\Delta T_j$), and cell ID ($ID_j$). There can be up to P thresholds e.g. P=2 for (P+1) CE levels.

TABLE 2

A general example of logged measurement results associated with CE level

| Logged results set (Sj) | CE level ($N_j$) | Threshold ($T_{ij}$) | Relative time ($\Delta T_j$) | Cell ID ($ID_j$) |
|---|---|---|---|---|
| 1 | $N_1$ | ($T_{11}$, $T_{21}$, . . . , $T_{P1}$) | $\Delta T_1$ | $ID_1$ |
| 2 | $N_2$ | ($T_{12}$, $T_{22}$, . . . , $T_{P2}$) | $\Delta T_2$ | $ID_2$ |
| . . . | . . . | . . . | . . . | . . . |
| K | $N_K$ | ($T_{1k}$, $T_{2K}$, . . . , $T_{PK}$) | $\Delta T_K$ | $ID_K$ |
| K + 1 | $N_{K+1}$ | ($T_{1k+1}$, $T_{2K+1}$, . . . , $T_{PK+1}$) | $\Delta T_{K+1}$ | $ID_{K+1}$ |
| K + 2 | $N_{K+2}$ | ($T_{1k+2}$, $T_{2K+2}$, . . . , $T_{PK+2}$) | $\Delta T_{K+2}$ | $ID_{K+2}$ |
| . . . | . . . | . . . | . . . | . . . |
| N | $N_N$ | ($T_{1N}$, $T_{2N}$, . . . , $T_{PN}$) | $\Delta T_N$ | N |

Logging Example #3

Table 3 shows another general example where the UE is configured to log CE level in a cell, thresholds for deriving the CE level in that cell and the measurement results (e.g. RSRP) for deriving the CE level. The logged information includes: CE level ($N_j$), measurement result ($M_j$) for deriving the CE level, signal level threshold ($T_{ij}$), relative time ($\Delta T_1$), and cell ID ($ID_j$). There can be up to P thresholds e.g. P=2 for (P+1) CE levels.

TABLE 3

A general example of logged measurement results associated with CE level

| Logged results set (Sj) | CE level ($N_j$) | Threshold ($T_{ij}$) | Measurement result ($M_j$) | Relative time ($\Delta T_j$) | Cell ID ($ID_j$) |
|---|---|---|---|---|---|
| 1 | $N_1$ | ($T_{11}$, $T_{21}$, . . . , $T_{P1}$) | $M_1$ | $\Delta T_1$ | $ID_1$ |
| 2 | $N_2$ | ($T_{12}$, $T_{22}$, . . . , $T_{P2}$) | $M_2$ | $\Delta T_2$ | $ID_2$ |
| . . . | . . . | . . . | . . . | . . . | . . . |
| K | $N_K$ | ($T_{1k}$, $T_{2K}$, . . . , $T_{PK}$) | $M_K$ | $\Delta T_K$ | $ID_K$ |
| K + 1 | $N_{K+1}$ | ($T_{1k+1}$, $T_{2K+1}$, . . . , $T_{PK+1}$) | $M_{K+1}$ | $\Delta T_{K+1}$ | $ID_{K+1}$ |
| K + 2 | $N_{K+2}$ | ($T_{1k+2}$, $T_{2K+2}$, . . . , $T_{PK+2}$) | $M_{K+2}$ | $\Delta T_{K+2}$ | $ID_{K+2}$ |
| . . . | . . . | . . . | . . . | . . . | . . . |
| N | $N_N$ | ($T_{1N}$, $T_{2N}$, . . . , $T_{PN}$) | $M_N$ | $\Delta T_N$ | N |

Logging Example #4

Table 4 shows a specific example where the UE is configured to log CE level in cell1 and cell2 where 2 RSRP thresholds for deriving CE level are configured. This means the UE can estimate one of the three possible CE levels (e.g. CE level 0, #1 or #2) in a cell based on the RSRP measurement and the configured RSRP thresholds in that cell. In cell with ID=0 the thresholds are −80 dBm and −100 dBm. In cell with ID=1 the thresholds are −90 dBm and −110 dBm. In this example the logging is done periodically every 5120 ms for logging duration of 40960 ms i.e. 8 logged values i.e. up to 20480 ms from the start of the log. The table shows the CE level logged at different logged time instance in cell with cell ID #0 and cell ID #1. logged information includes: CE level ($N_j$), measurement result ($M_j$) for deriving the CE level, signal level threshold ($T_{ij}$), relative time ($\Delta T_j$), and cell ID ($ID_j$). There can be up to P thresholds e.g. P=2 for (P+1) CE levels.

In this example the logging is done periodically every 5120 ms for logging duration of 40960 ms i.e. 8 logged values. The first log also starts 5120 ms from the reference time (e.g. serving cell timing). It is assumed that the UE is configured to log the results in the serving cell, which changes from cell with ID 0 to cell with ID 1 at 20480 from the start of the log.

TABLE 4

A specific example of logged measurement results associated with CE level

| Logged results set (Sj) | CE level ($N_j$) | RSRP threshold ($T_{ij}$) [dBm] | Measurement result ($M_j$) [dBm] | Relative time ($\Delta T_j$) [ms] | Cell ID ($ID_j$) |
|---|---|---|---|---|---|
| 1 | 1 | (−80, −100) | −90 | 5120 | 0 |
| 2 | 0 | (−80, −100) | −70 | 10240 | 0 |
| 3 | 1 | (−80, −100) | −95 | 15360 | 0 |
| 4 | 2 | (−80, −100) | −110 | 20480 | 0 |
| 5 | 1 | (−90, −110) | −101 | 25600 | 1 |
| 6 | 2 | (−90, −110) | −96 | 30720 | 1 |
| 7 | 0 | (−90, −110) | −85 | 35840 | 1 |
| 8 | 1 | (−90, −110) | −100 | 40960 | 1 |

Logging Example #5

An example #5 of logging is shown in Table 5. In this example, the CE level change indicating bit (1 bit) is used to indicate whether the CE level is changed or can be changed or criteria for changing can been fulfilled with respect to reference CE level e.g. latest/current CE level. Relative change can be expressed with 1 bit to indicate whether the CE level change has increase or decrease with regard to the reference CE level e.g. 0 means CE level has decreased or lowered (e.g. from CE level 2 to CE level 1) and 1 means CE level has increased or gone up (e.g. from CE level 1 to CE level 2). If the CE level does not change then the UE does not log this bit i.e. absence of this bit indicates that the CE level has not changed with regard to the reference CE level. Alternatively the relative CE level change can be expressed by 2-bits e.g. 00=no change; 01=decrease in CE level and 10=increase in CE level. The other additional information as described above can be logged together and reported.

TABLE 5

A specific example of logged measurement results associated with CE level

| Logged results set (Sj) | Relative CE level change with regard to reference CE level | Relative time ($\Delta T_j$) | Cell ID ($ID_j$) |
|---|---|---|---|
| 1 | N/A | $\Delta T_1$ | $ID_1$ |
| 2 | N/A | $\Delta T_2$ | $ID_2$ |
| . . . | 1 | . . . | . . . |
| K | N/A | $\Delta T_K$ | $ID_K$ |
| K + 1 | 0 | $\Delta T_{K+1}$ | $ID_{K+1}$ |
| K + 2 | N/A | $\Delta T_{K+2}$ | $ID_{K+2}$ |
| . . . | 1 | . . . | . . . |
| N | N/A | $\Delta T_N$ | N |

Methods in a Network Node

According to certain embodiments, a method in a network node (e.g. NN1, gNB), BS), the tasks of NN1 comprises:

- Configuring the UE with one or more parameters for enabling the UE to log the CE level related information which includes at least:
  - Configured number of CE levels and/or associated thresholds used by the UE for deriving the CE level,
  - CE level and/or changes in CE levels at the time of logging,
  - Logging time e.g. relative time compared to a reference time,
  - Cell ID of the cell where the CE level change occurred or where the CE level was logged
  - One or more parameters used by the UE for deriving CE level e.g. measurement threshold that was used by the UE for triggering the change in CE level
  - Time spent (or percentage of time) in a CE level before CE level change occurred
  - Location information when the CE level change occurred According to certain embodiments, the network node receives the logged information from related to the above from the UE and uses it for one or more operation tasks such as:

- Adapting one or more settings/configurations (e.g. PRACH configurations, measurement thresholds, number of CE levels, transmit power) affecting its deployment
- Adapting one or more of its procedures or actions which may relate to e.g. SON, O&M.
- Signaling the adapted information to the UE
- Updating of coverage information based on the received logged information
- An action related to network (re) planning
- An action of optimizing one or more network parameters FIG. 1 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160*b*, and wireless devices 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 2:
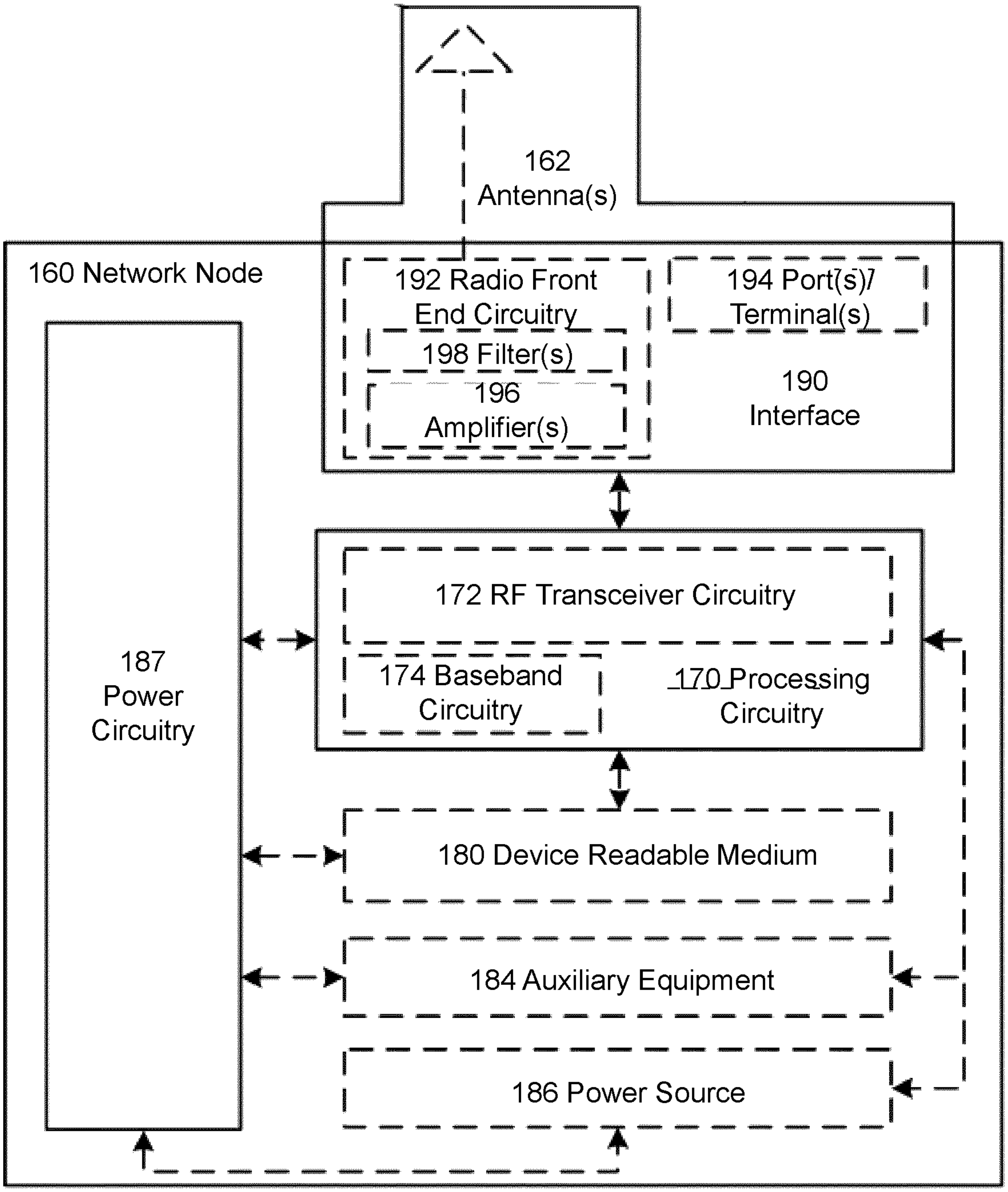
FIG. 2 illustrates an example network node, according to certain embodiments.

FIG. 2 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 3:
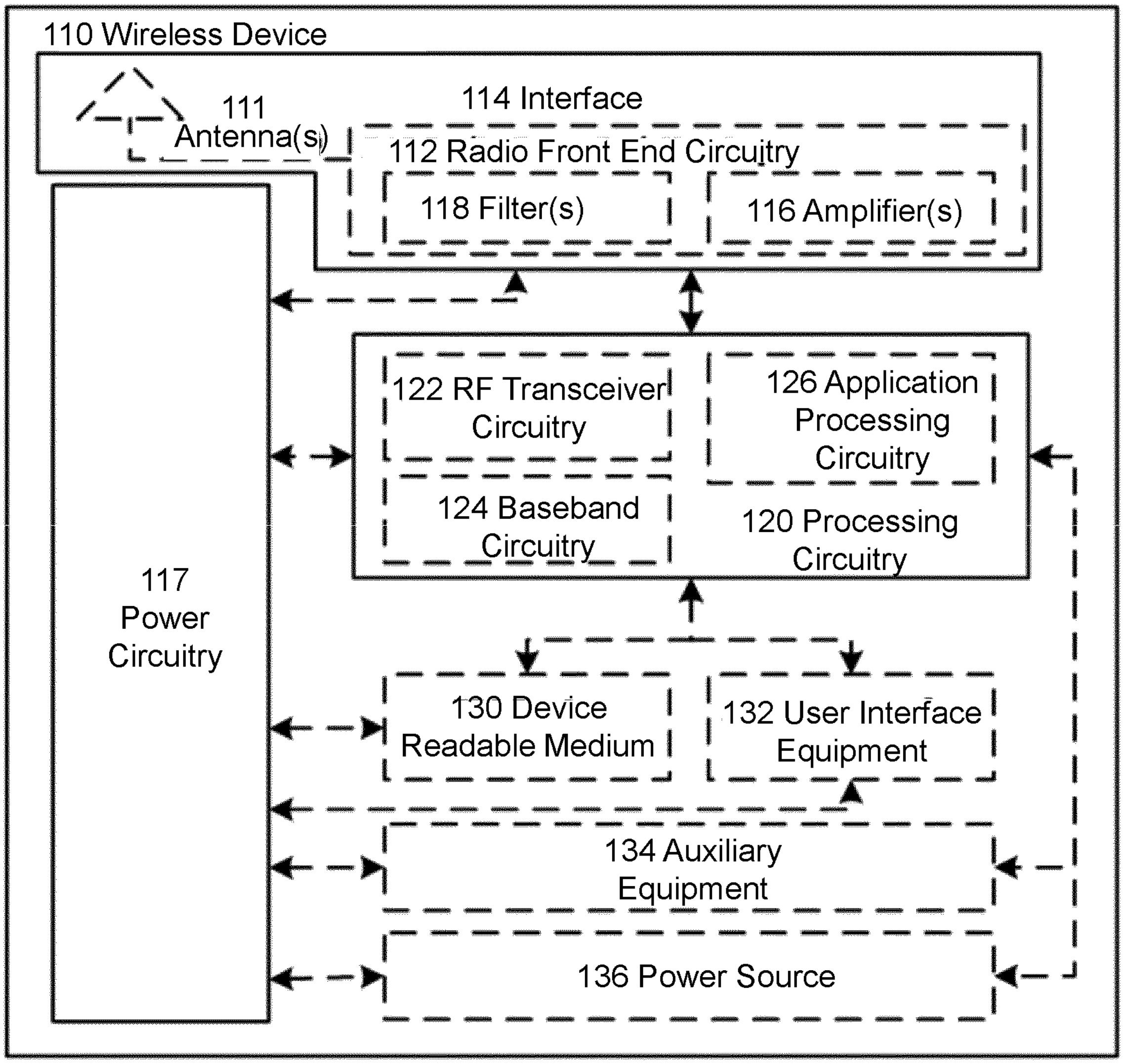
FIG. 3 illustrates an example wireless device, according to certain embodiments.

FIG. 3 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 4:
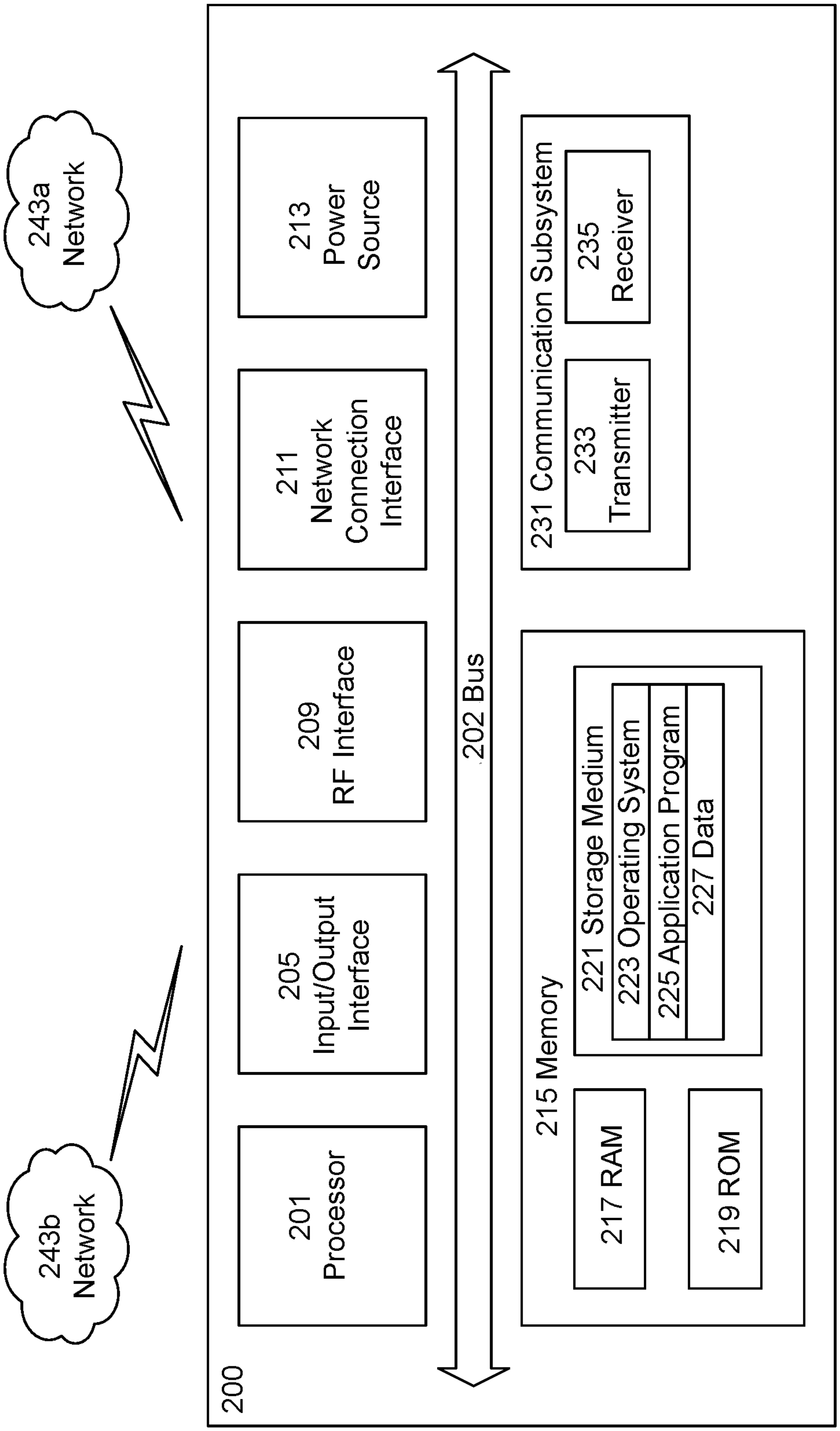
FIG. 4 illustrate an example user equipment, according to certain embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 4 is a UE, the components discussed herein are equally applicable to a wireless device, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 4, or only a subset of the components.

The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
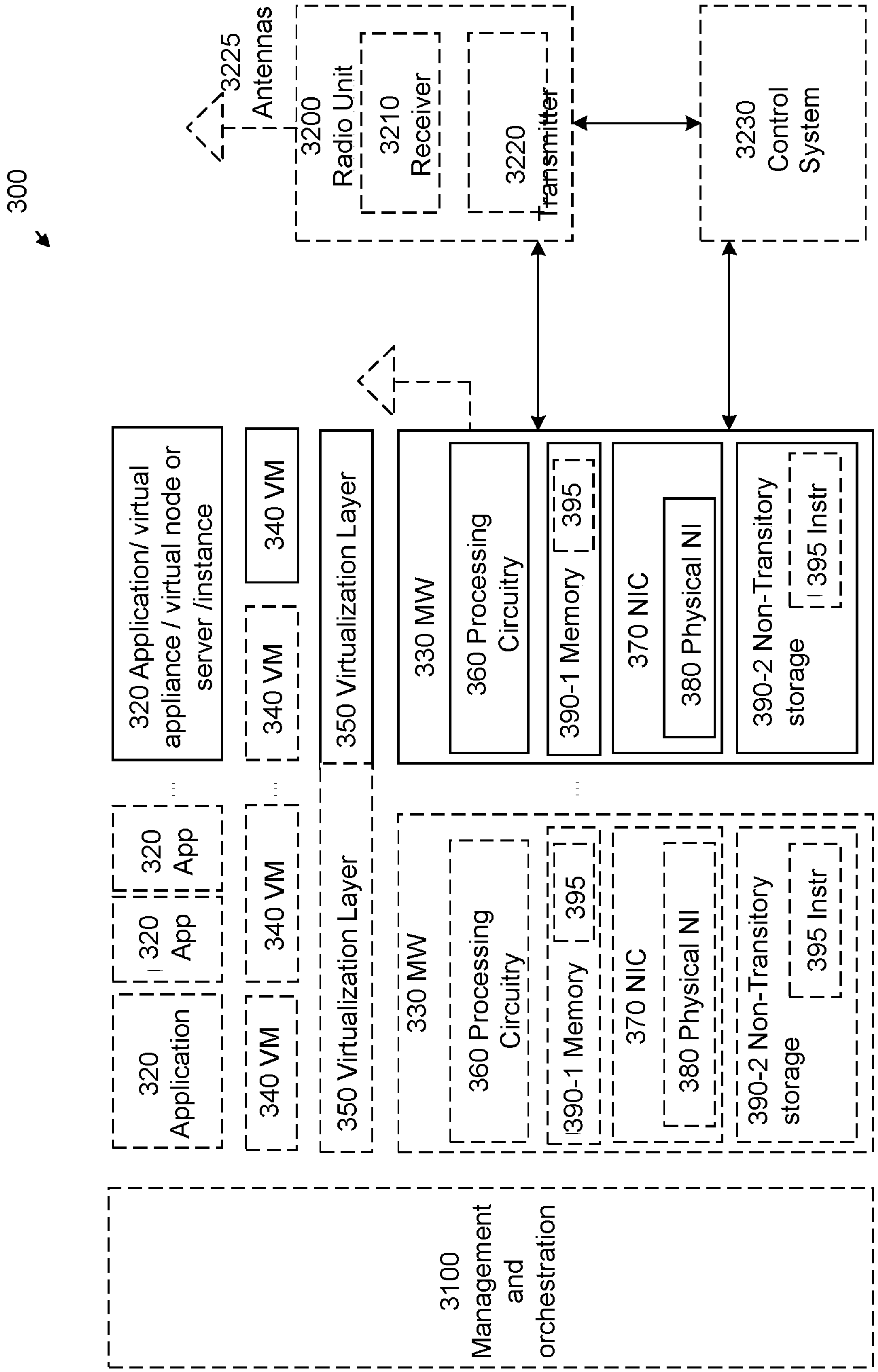
FIG. 5 illustrates a virtualization environment in which functions implemented by some embodiments may be virtualized, according to certain embodiments.

FIG. 5 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 5, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 5.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 6:
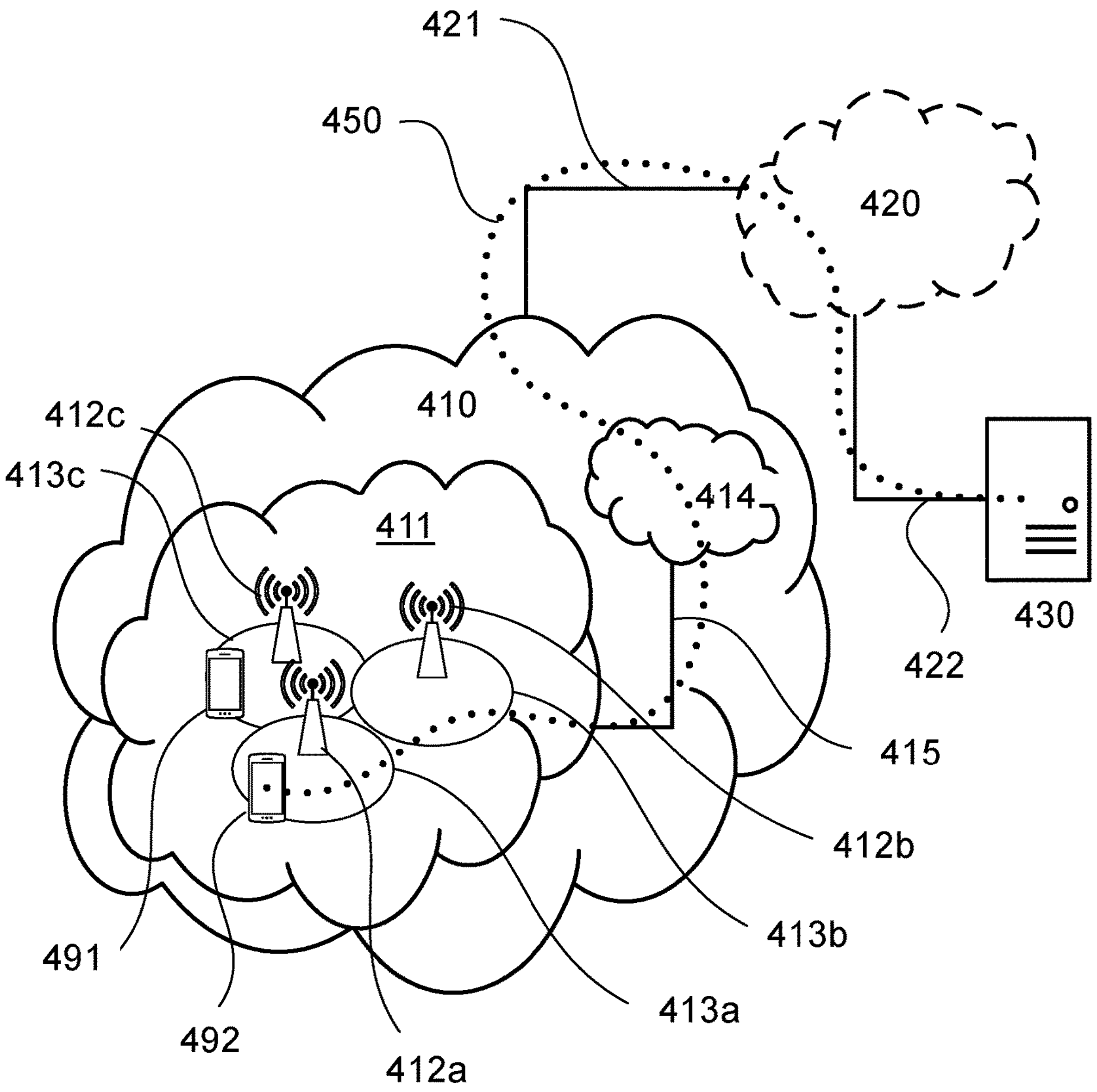
FIG. 6 illustrates a telecommunication network connected via an intermediate network to a host computer, according to certain embodiments.

FIG. 6 illustrates a telecommunication network connected via an intermediate network to a host computer in accordance with some embodiments.

With reference to FIG. 6, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 6 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 7:
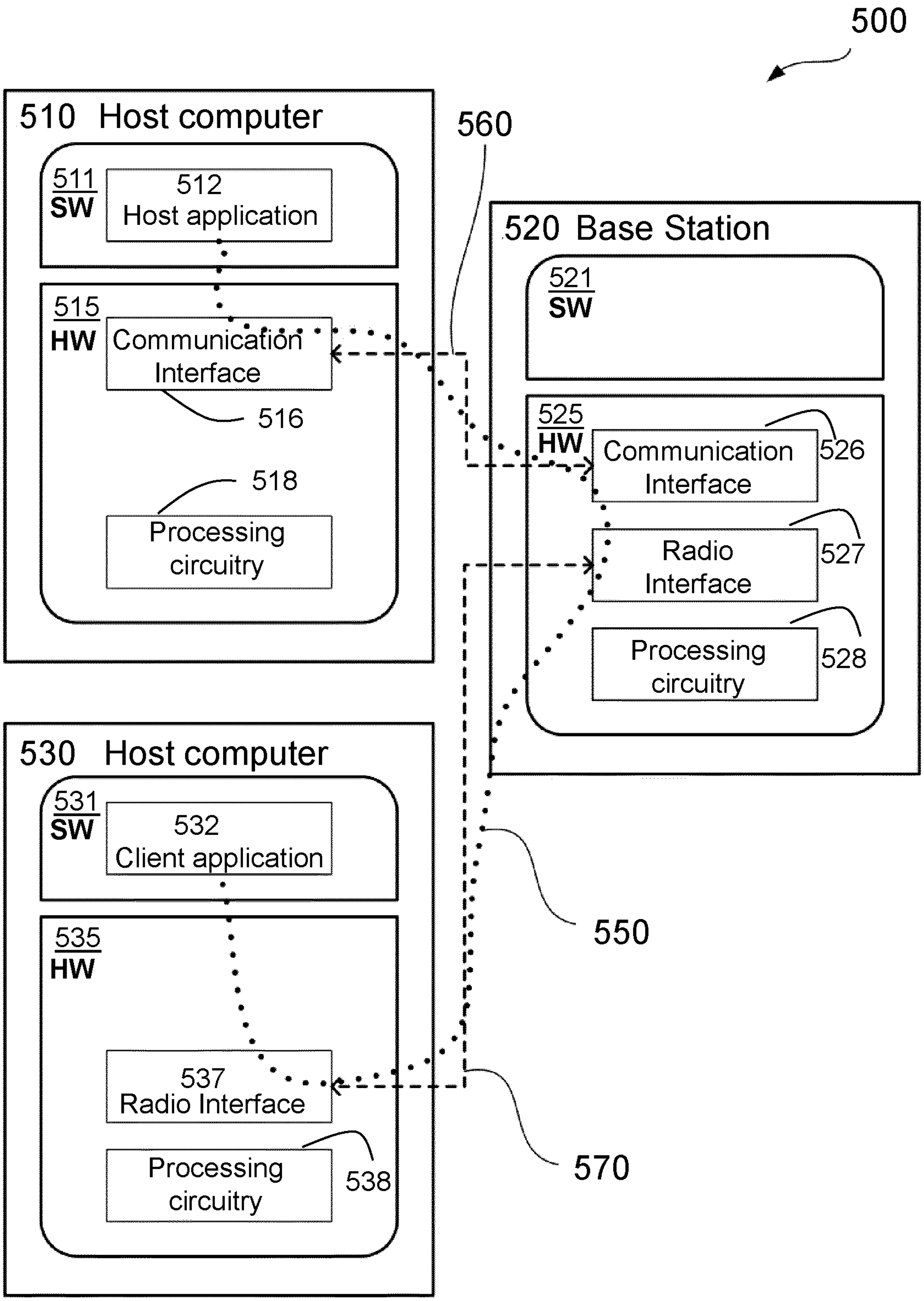
FIG. 7 illustrates a generalized block diagram of a host computer communicating via a base station with a user equipment over a partially wireless connection, according to certain embodiments.

FIG. 7 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 7. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 7 may be similar or identical to host computer 430, one of base stations 412*a*, 412*b*, 412*c* and one of UEs 491, 492 of FIG. 6, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 8:
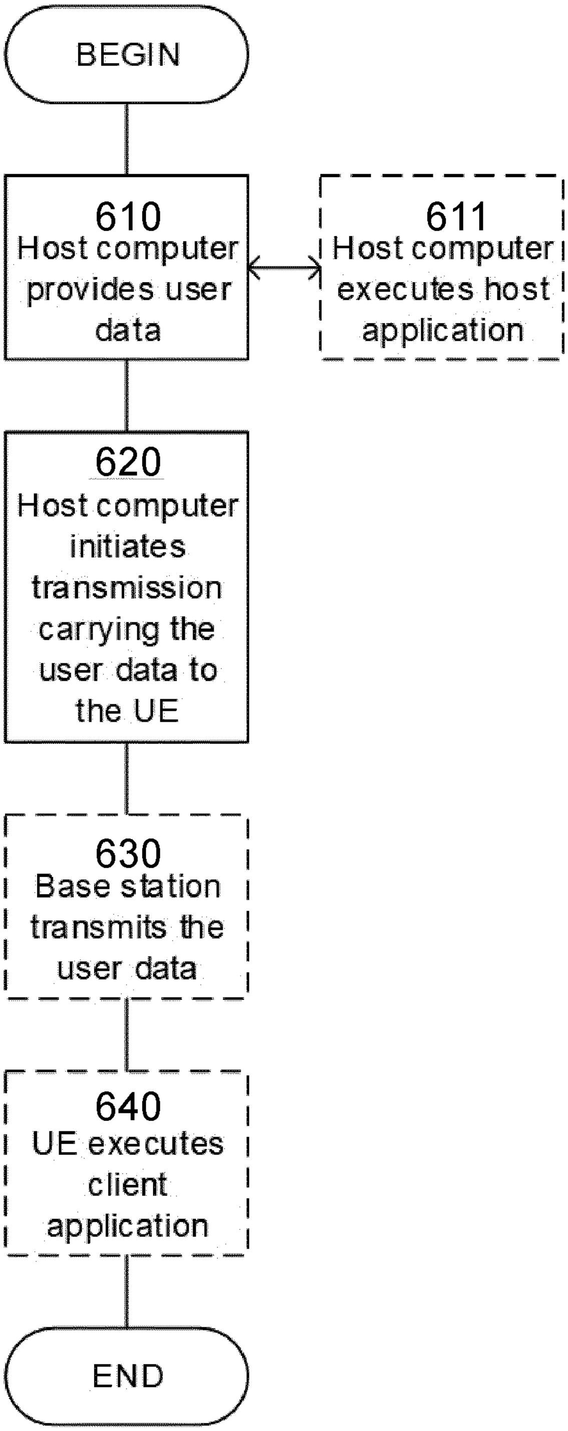
FIG. 8 illustrates a method implemented in a communication system, according to one embodiment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 9:
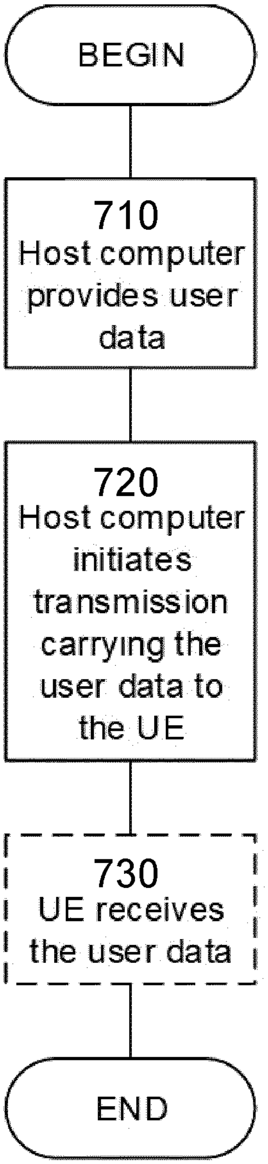
FIG. 9 illustrates another method implemented in a communication system, according to one embodiment.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 10:
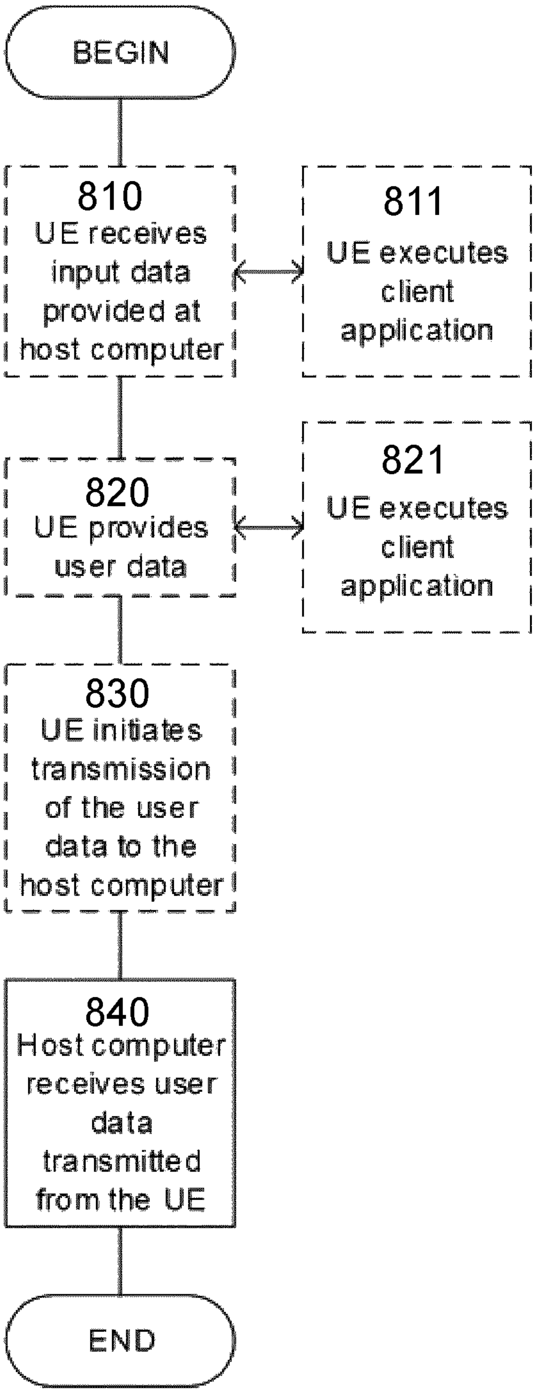
FIG. 10 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 11:
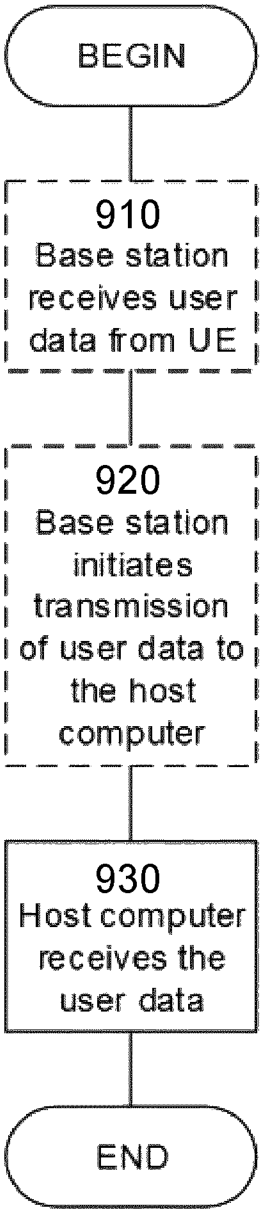
FIG. 11 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 12:
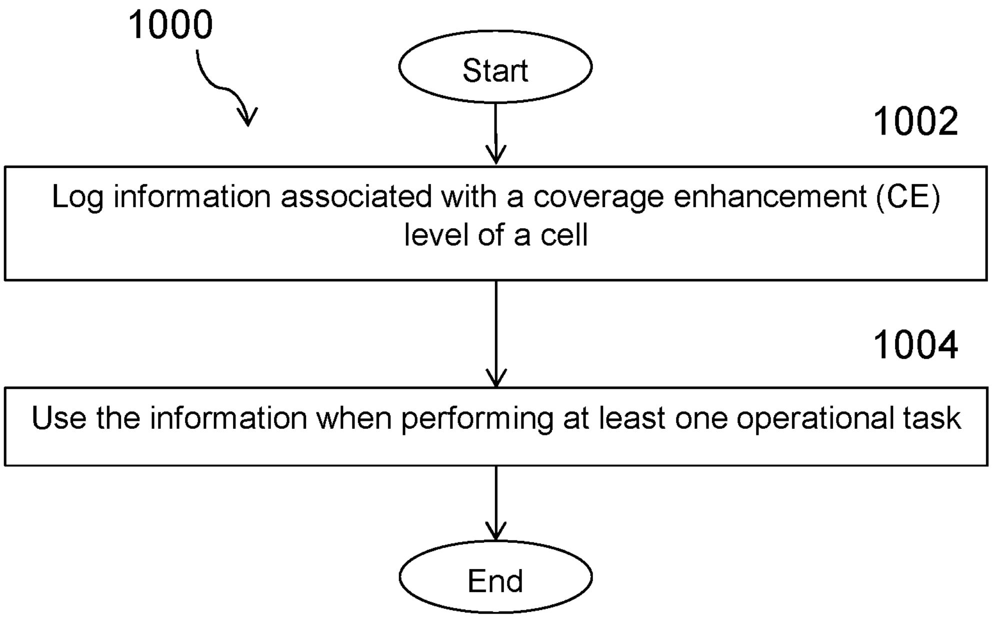
FIG. 12 illustrates an example method by a wireless device, according to certain embodiments.

FIG. 12 depicts a method 1000 by a wireless device 110, according to certain embodiments. At step 1002, the wireless device 110 logs information associated with a CE level of a cell. At step 1004, the wireless device 110 uses the information when performing at least one operational task.

In a particular embodiment, the information associated with a CE level comprises an identifier of the CE level of the cell and information indicating a CE level change in the cell.

In a particular embodiment, the at least one operational task comprises at least one of: transmitting the information associated with a CE level to a network node 160; determining a requirement to be fulfilled by the wireless device 110; selecting a CE level; and adapting at least one transceiver parameter for transmitting and/or receiving signals by the wireless device 110.

In a particular embodiment, the information associated with the CE level comprises at least one of: a configured number of CE levels, at least one threshold used by the wireless device 110 for deriving the CE level, an identifier of the CE level, a change in the CE level at the time of logging the information, a last CE level determined by the wireless device 110, the CE level in a particular cell, a current CE level, a target CE level, a logging time, and a Cell ID of the cell where the CE level change occurred or where the CE level was logged.

In a particular embodiment, the information associated with the CE level comprises at least one of: one or more parameters used by the wireless device 110 for deriving CE level; an amount of time spent (or percentage of time) in a CE level before CE level change occurred; and location information when the CE level change occurred.

In a particular embodiment, the wireless device 110 detects an event triggering a procedure; and logs the information associated with a CE level in response to detecting the event triggering the procedure. In a further particular embodiment, the procedure comprises at least one of: performing a type of measurement in the cell; acquiring a cell global identity of the cell; and acquiring system information associated with the cell for performing cell reselection to the cell.

In a particular embodiment, the wireless device 110 determines that an event has occurred or at least one condition has been fulfilled and logs the information associated with a CE level in response to determining that the event has occurred or the at least one condition has been fulfilled. In a particular embodiment, the event or the at least one condition comprises at least one of: a change in the CE level in a serving cell, a neighboring cell, and/or a strongest cell; a cell reselection procedure from a source cell to a target cell; a request from a network node 160 is received, the request indicating that a measurement is to be performed; a change in a signal level by more than a threshold amount in the cell; and a time expiration. In a further particular embodiment, the event or the at least one condition is triggers the performance of a measurement to be performed in the cell, and the wireless device 110 performs the measurement. In a further particular embodiment, the measurement comprises at least one of a ANR measurement, a positioning measurement, and a cell change measurement.

In a particular embodiment, the wireless device 110 determines that a threshold amount of time has passed, and wherein the at least one operational task is performed in response to determining that the threshold amount of time has passed. In a further particular embodiment, the at least one operational task comprises removing the information from a data store.

In a particular embodiment, performing the at least one operational task comprises determining that the wireless device 110 has switched to a higher Radio Resource Control activity state and reporting the information to a network node 160.

In a particular embodiment, the wireless device 110 logs, with the information associated with the CE level, additional information comprising at least one of: a time instance (Tg) when the information associated with the CE level is logged by the wireless device 110; an amount of time spent by the wireless device 110 in a particular CE level in the cell; a location of the wireless device 110 when the information associated with the CE level is logged; a cell identifier of the cell where the information associated with the CE level is logged by the wireless device 110; one or more signal level thresholds for determining the CE level; a measured signal level used for determining the CE level; a transmission configuration of signals associated with one or more CE levels in a cell; and one or more PRACH configuration parameters associated with the CE level determined by the wireless device 110.

In a particular embodiment, when logging the information associated with the CE level, the wireless device 110 stores the information associated with the CE level in a data store of the wireless device 110.

In a particular embodiment, the wireless device 110 receives, from a network node 160, a configuration for performing the logging of the information associated with the CE level, and the logging of the information by the wireless device 110 is performed in response to or based on the configuration.

In a particular embodiment, the wireless device 110 receives, from a network node 160, a Radio Resource Control (RRC) message that triggers or initiates the logging of the information associated with the CE level by the wireless device 110, and the wireless device 110 logs the information in response to or based on the RRC message.

Figure 13:
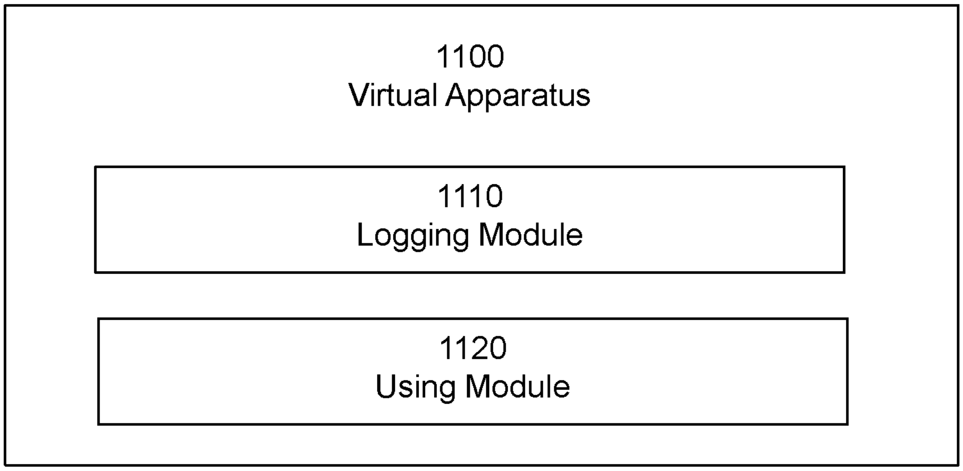
FIG. 13 illustrates an example virtual apparatus, according to certain embodiments.

FIG. 13 illustrates a schematic block diagram of a virtual apparatus 1100 in a wireless network (for example, the wireless network shown in FIG. 1). The apparatus may be implemented in a wireless device or network node (e.g., wireless device 110 or network node 160 shown in FIG. 1). Apparatus 1100 is operable to carry out the example method described with reference to FIG. 12 and possibly any other processes or methods disclosed herein. It is also to be understood that the method of FIG. 12 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause logging module 1110, using module 1120, and any other suitable units of apparatus 1100 to perform corresponding functions according one or more embodiments of the present disclosure.

According to certain embodiments, logging module 1110 may perform certain of the logging functions of the apparatus 1100. For example, logging module 1110 may log information associated with a CE level of a cell.

According to certain embodiments, using module 1120 may perform certain of the using functions of the apparatus 1100. For example, using module 1120 may use the information when performing at least one operational task.

As used herein, the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 14:
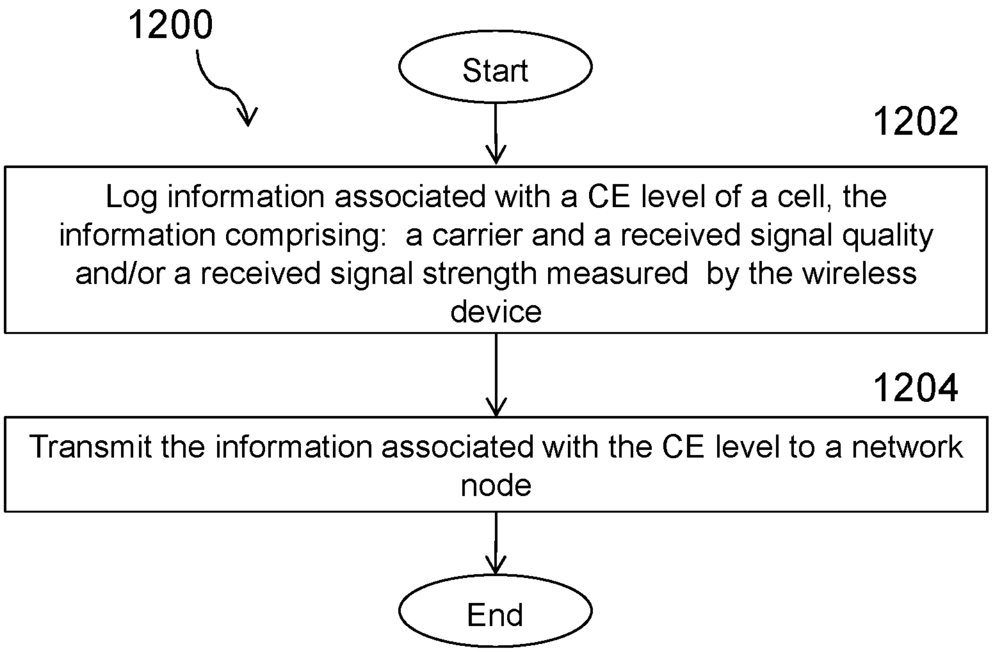
FIG. 14 illustrates another example method by a wireless device, according to certain embodiments.

FIG. 14 depicts another method 1200 by a wireless device 110, according to certain embodiments. At step 1202, the wireless device 110 logs information associated with a CE level of a cell. The information includes a carrier and a received signal quality and/or a received signal strength measured by the wireless device. At step 1204, the wireless device 110 transmits the information associated with the CE level to a network node 160.

In a particular embodiment, the information is transmitted to the network node in an ANR report.

In a particular embodiment, logging the information associated with the CE level comprises periodically determining and logging the CE level of the cell according to a regular time interval.

In a particular embodiment, the cell is associated with a carrier frequency.

In a particular embodiment, the information comprises a relative timestamp indicating a time when the information associated with the CE level was logged.

In a particular embodiment, the received signal quality and/or the received signal strength comprises a Reference Signal Received Quality, RSRQ, and/or a Reference Signal Received Power, RSRP.

In a particular embodiment, the information associated with the CE level comprises an identifier of the CE level of the cell and information indicating a CE level change in the cell.

In a particular embodiment, the wireless device 110 performs at least one of: determining a requirement to be fulfilled by the wireless device 110, selecting a CE level, and adapting at least one transceiver parameter for transmitting and/or receiving signals by the wireless device.

In a particular embodiment, the information associated with the CE level further comprises at least one of: a configured number of CE levels, at least one signal level threshold used by the wireless device for deriving the CE level, a last CE level determined by the wireless device, the CE level in a particular cell, a current CE level, a target CE level, and a relative logging time (Tg) when the information associated with the CE level is logged by the wireless device, one or more parameters used by the wireless device for deriving CE level, an amount of time spent in a CE level before a CE level change occurred, location information when a CE level change occurred, a location of the wireless device when the information associated with the CE level is logged, a transmission configuration of signals associated with one or more CE levels in the cell, and one or more PRACH configuration parameters associated with the CE level determined by the wireless device.

In a particular embodiment, the wireless device determines that an event has occurred or at least one condition has been fulfilled and logs the information associated with a CE level in response to determining that the event has occurred or the at least one condition has been fulfilled. In a further particular embodiment, the event or the at least one condition comprises at least one of: acquiring a cell global identity of the cell; acquiring system information for performing cell reselection to the cell; detecting a change in the CE level in a serving cell, a neighboring cell, and/or a strongest cell; performing a cell reselection procedure from a source cell to a target cell; receiving a request from a network node, the request indicating that a measurement is to be performed; detecting a change in a signal level by more than a threshold amount in the cell; and detecting a time expiration.

In a particular embodiment, the event or the at least one condition triggers the performance of a measurement to be performed in the cell, and the method further comprises performing the measurement. In a further particular embodiment, the measurement comprises at least one of an ANR measurement, a positioning measurement, and a cell change measurement.

In a particular embodiment, the wireless device 110 determines that a threshold amount of time has passed, and the information associated with the CE level is transmitted to the network node in response to determining that the threshold amount of time has passed. In a further particular embodiment, the wireless device 110 removes the information from a data store.

In a particular embodiment, the information associated with the CE level is transmitted to the network node in response to determining that the wireless device has switched to a higher Radio Resource Control activity state.

In a particular embodiment, logging the information associated with the CE level comprises storing the information associated with the CE level in a data store of the wireless device.

In a particular embodiment, the wireless device 110 receives, from a network node 160, a configuration for performing the logging of the information associated with the CE level, and the wireless device 110 logs the information in response to or based on the configuration.

In a particular embodiment, the wireless device 110 receives, from a network node 160, a RRC message that triggers or initiates the logging of the information associated with the CE level by the wireless device, and the wireless device 110 logs the information in response to or based on the RRC message.

In a particular embodiment, the CE level further comprises at least one of: a relation between the received signal quality measured by the wireless device and a signal quality threshold; a relation between the received signal strength measured by the wireless device and a signal strength threshold; and an indicator of CE level received from the network node. In a particular embodiment, the relation may be a comparison such as, for example, NSCH Ês/Iot−6 dB.

Figure 15:
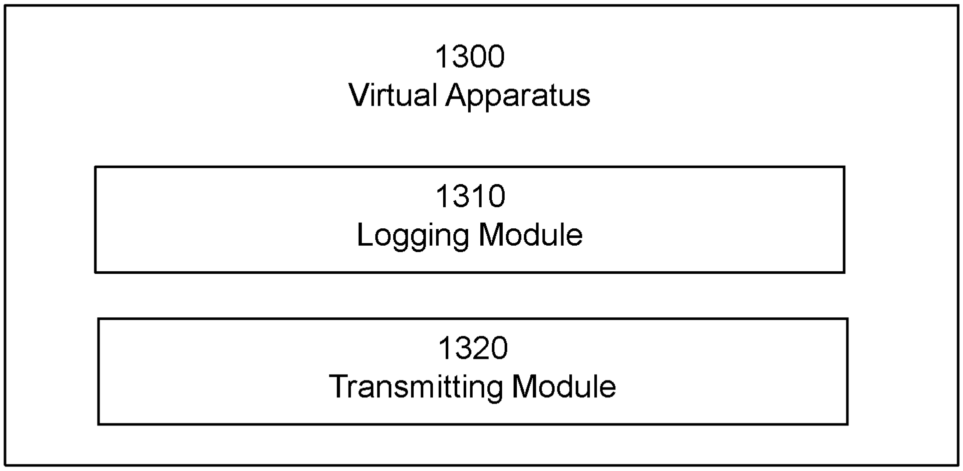
FIG. 15 illustrates another example virtual apparatus, according to certain embodiments.

FIG. 15 illustrates a schematic block diagram of a virtual apparatus 1300 in a wireless network (for example, the wireless network shown in FIG. 1). The apparatus may be implemented in a wireless device or network node (e.g., wireless device 110 or network node 160 shown in FIG. 1). Apparatus 1300 is operable to carry out the example method described with reference to FIG. 14 and possibly any other processes or methods disclosed herein. It is also to be understood that the method of FIG. 14 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause logging module 1310, transmitting module 1320, and any other suitable units of apparatus 1300 to perform corresponding functions according one or more embodiments of the present disclosure.

According to certain embodiments, logging module 1310 may perform certain of the logging functions of the apparatus 1300. For example, logging module 1310 may log information associated with a CE level of a cell. The information includes a carrier and a received signal quality and/or a received signal strength measured by the wireless device. According to certain embodiments, transmitting module 1320 may perform certain of the transmitting functions of the apparatus 1300. For example, transmitting module 1320 may transmit the information associated with the CE level to a network node 160.

Figure 16:
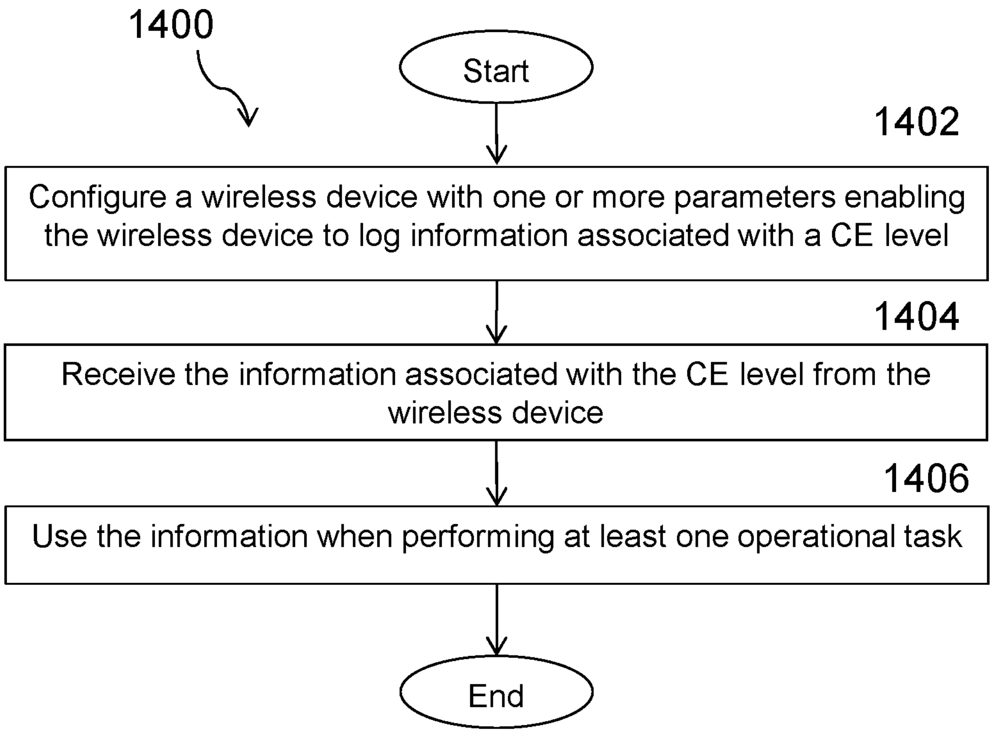
FIG. 16 illustrates an example method by a network node, according to certain embodiments.

FIG. 16 depicts a method 1400 by a network node 160, according to certain embodiments. At step 1402, the network node 160 configures a wireless device 110 with one or more parameters enabling the wireless device 110 to log information associated with a CE level. At step 1404, the network node 160 receives the information associated with the CE level from the wireless device 110. At step 1406, the network node 160 uses the information when performing at least one operational task.

In a particular embodiment, the information comprises an identifier of the CE level of the cell and information indicating a CE level change in the cell.

In a particular embodiment, the at least one operational task comprises at least one of: adapting a requirement to be fulfilled by the wireless device 110; adapting one or more parameters, settings, or configurations for selecting a CE level by the wireless device 110; adapting a PRACH configuration of the wireless device 110; adapting a threshold to be used in the performance of measurements by the wireless device 110; adapting a number of CE levels; adapting a transmit power of the wireless device 110; adapting a procedure or action to be performed by the wireless device 110; adapting at least one transceiver parameter for transmitting and/or receiving signals by the wireless device 110; and transmitting, to the wireless device 110, a message indicating an adapted requirement, an adapted parameter, an adapted threshold, an adapted configuration, an adapted number of CE levels, an adapted transmit power, an adapted procedure or action; an adapted transceiver parameter.

In a particular embodiment, the at least one operational task comprises at least one of: updating coverage information; an action associated with network planning or re-planning; and an action associated with optimizing one or more network parameters.

In a particular embodiment, the information associated with the CE level comprises at least one of: a configured number of CE levels, at least one threshold used by the wireless device 110 for deriving the CE level, an identifier of the CE level, a change in the CE level at the time of logging the information, a last CE level determined by the wireless device 110, the CE level in a particular cell, a current CE level of the wireless device 110, a target CE level of the wireless device 110, a time when the information associated with the CE level was logged by the wireless device 110, and a Cell ID of the cell where the CE level change occurred or where the CE level was logged by the wireless device 110.

In a particular embodiment, the information associated with the CE level comprises at least one of: one or more parameters used by the wireless device 110 for deriving CE level, an amount of time spent (or percentage of time) in a CE level before CE level change occurred, and location information of the wireless device 110 when the CE level change occurred.

In a particular embodiment, the network node configures the wireless device 110 to detect an event triggering a procedure by the wireless device 110 and log the information associated with a CE level in response to detecting the event triggering the procedure. In a further particular embodiment, the procedure comprises at least one of: performing a type of measurement in the cell; acquiring a cell global identity of the cell; and acquiring system information associated with the cell for performing cell reselection to the cell.

In a particular embodiment, the network node 160 configures the wireless device 110 to determine that an event has occurred or at least one condition has been fulfilled and log the information associated with a CE level in response to determining that the event has occurred or the at least one condition has been fulfilled. In a further particular embodiment, the event or the at least one condition comprises at least one of: a change in the CE level of the wireless device 110 in a serving cell, a neighboring cell, and/or a strongest cell; a cell reselection procedure by the wireless device 110 from a source cell to a target cell; reception of a request from a network node 160, the request indicating that a measurement is to be performed; a change in a signal level of the wireless device 110 by more than a threshold amount in the cell; and a time expiration. In a particular embodiment, the event or the at least one condition is triggers the performance of a measurement to be performed in the cell by the wireless device 110, and the network node 160 configures the wireless device 110 to perform the measurement. In a further particular embodiment, the measurement comprises at least one of a ANR measurement, a positioning measurement, a cell change measurement.

In a particular embodiment, the network node configures the wireless device 110 to determine that a threshold amount of time has passed and perform at least one operational task in response to determining that the threshold amount of time has passed. In a further particular embodiment, the network node 160 configures the wireless device 110 to remove the information associated with the CE level from a data store of the wireless device 110.

In a particular embodiment, the network node configures the wireless device 110 to determine that the wireless device 110 has switched to a higher RRC activity state and report the information associated with the CE level to a network node 160 in response to determining that the wireless device 110 has switched to the higher RRC activity state.

In a particular embodiment, the network node 160 configures the wireless device 110 to log additional information with the information associated with the CE level, the additional information comprising at least one of: a time instance (Tg) when the information associated with the CE level is logged; an amount of time spent by the wireless device 110 in a particular CE level in the cell; a location at which the information associated with the CE level is logged; a cell identifier of the cell where the information associated with the CE level is logged; one or more signal level thresholds for determining the CE level; a measured signal level used for determining the CE level; a transmission configuration of signals associated with one or more CE levels in a cell; and one or more PRACH configuration parameters associated with the CE level determined by the wireless device 110.

In a particular embodiment, the network node 160 configures the wireless device 110 to store the information associated with the CE level in a data store of the wireless device 110.

In a particular embodiment, the network node 160 transmits, to the wireless device 110, a configuration for performing the logging of the information associated with the CE level.

In a particular embodiment, the network node 160 transmits, to the wireless device 110, a RRC message that triggers or initiates the logging of the information associated with the CE level by the wireless device 110.

Figure 17:
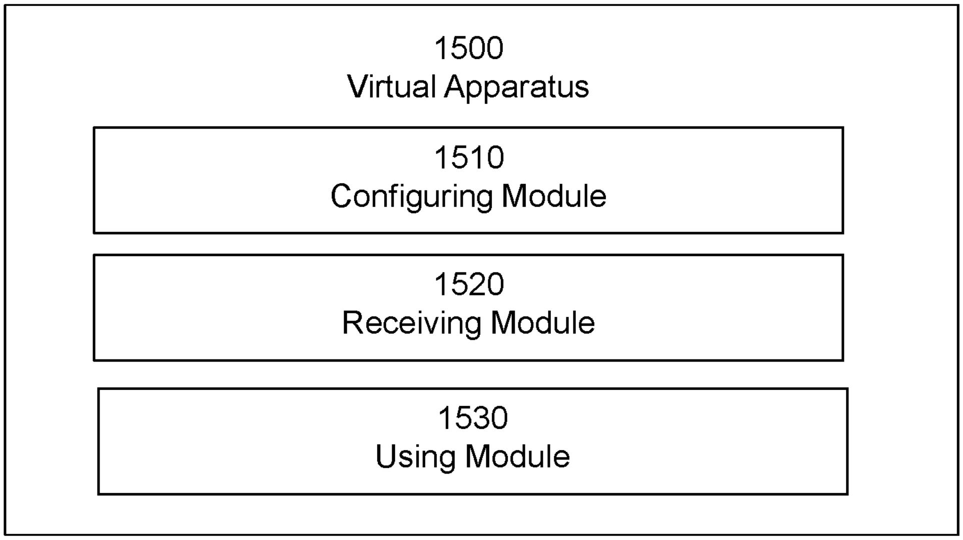
FIG. 17 illustrates another example virtual apparatus, according to certain embodiments.

FIG. 17 illustrates a schematic block diagram of a virtual apparatus 1500 in a wireless network (for example, the wireless network shown in FIG. 1). The apparatus may be implemented in a wireless device or network node (e.g., wireless device 110 or network node 160 shown in FIG. 1). Apparatus 1500 is operable to carry out the example method described with reference to FIG. 16 and possibly any other processes or methods disclosed herein. It is also to be understood that the method of FIG. 16 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause configuring module 1510, receiving module 1520, using module 1530, and any other suitable units of apparatus 1500 to perform corresponding functions according one or more embodiments of the present disclosure.

According to certain embodiments, configuring module 1510 may perform certain of the configuring functions of the apparatus 1500. For example, configuring module 1510 may configure a wireless device with one or more parameters enabling the wireless device to log information associated with a CE level.

According to certain embodiments, receiving module 1520 may perform certain of the receiving functions of the apparatus 1500. For example, receiving module 1520 may receive the information associated with the CE level from the wireless device.

According to certain embodiments, using module 1530 may perform certain of the using functions of the apparatus 1500. For example, using module 1530 may use the information when performing at least one operational task.

Figure 18:
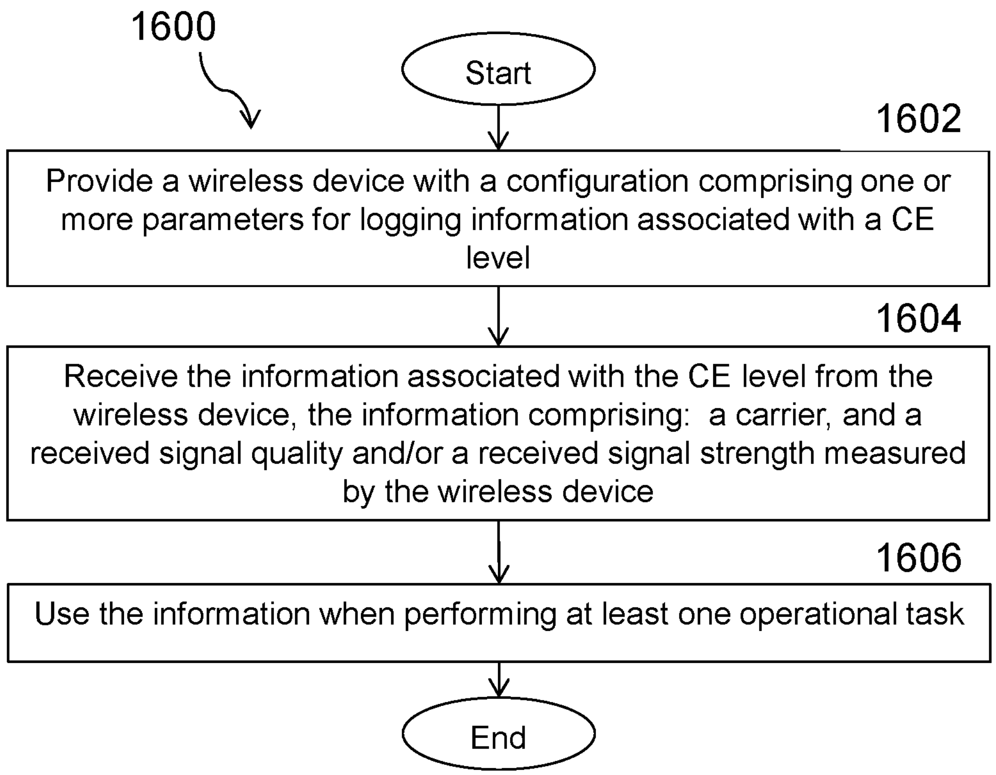
FIG. 18 illustrates another example method by a network node, according to certain embodiments.

FIG. 18 depicts a method 1600 by a network node 160, according to certain embodiments. At step 1602, the network node 160 provides a wireless device 110 with a configuration comprising one or more parameters for logging information associated with a CE level. At step 1604, the network node 160 receives the information associated with the CE level from the wireless device. The received information includes a carrier and a received signal quality and/or a received signal strength measured by the wireless device. At step 1606, the network node 160 uses the information when performing at least one operational task. In a particular embodiment, the information is received in an ANR report.

In a particular embodiment, the one or more parameters trigger the wireless device to periodically log the information associated with the CE level according to a regular time interval.

In a particular embodiment, the cell is associated with a carrier frequency.

In a particular embodiment, the information comprises a relative timestamp indicating a time when the information associated with the CE level was logged.

In a particular embodiment, the received signal quality and/or the received signal strength comprises a RSRQ and/or a RSRP.

In a particular embodiment, the information comprises an identifier of the CE level of the cell and information indicating a CE level change in the cell.

In a particular embodiment, the at least one operational task comprises at least one of: updating coverage information; performing an action associated with network planning or re planning; performing an action associated with optimizing one or more network parameters; adapting a requirement to be fulfilled by the wireless device; adapting one or more parameters, settings, or configurations for selecting a new CE level and/or carrier by the wireless device; adapting a paging configuration of the wireless device based on CE level; adapting a Physical Random Access Channel, PRACH, configuration of the wireless device; adapting a threshold to be used in the performance of measurements by the wireless device; adapting a number of CE levels configured for the wireless device; adapting a transmit power of the wireless device; adapting a procedure or action to be performed by the wireless device; adapting at least one transceiver parameter for transmitting and/or receiving signals by the wireless device; and transmitting, to the wireless device, a message indicating an adapted requirement, an adapted parameter, an adapted threshold, an adapted configuration, an adapted number of CE levels, an adapted transmit power, an adapted procedure or action; an adapted transceiver parameter.

In a particular embodiment, the information associated with the CE level comprises at least one of: a configured number of CE levels, at least one signal threshold used by the wireless device for deriving the CE level, a last CE level determined by the wireless device, the CE level in a particular cell, a current CE level of the wireless device, a target CE level of the wireless device, a relative logging time (Tg) when the information associated with the CE level was logged by the wireless device, one or more parameters used by the wireless device for deriving CE level, an amount of time spent in a CE level before CE level change occurred, a location of the wireless device when the information associated with the CE level is logged, a transmission configuration of signals associated with one or more CE levels in the cell, and one or more PRACH configuration parameters associated with the CE level determined by the wireless device.

In a particular embodiment, the network node 160 configures the wireless device 110 to determine that an event has occurred or at least one condition has been fulfilled and log the information associated with the CE level in response to determining that the event has occurred or the at least one condition has been fulfilled. In a further particular embodiment, the event or the at least one condition comprises at least one of: acquiring a cell global identity of the cell; acquiring system information for performing cell reselection to the cell; detecting a change in the CE level of the wireless device in a serving cell, a neighboring cell, and/or a strongest cell; performing a cell reselection procedure by the wireless device from a source cell to a target cell; receiving a request from a network node, the request indicating that a measurement is to be performed; detecting a change in a signal level of the wireless device by more than a threshold amount in the cell; and detecting a time expiration.

In a particular embodiment, the event or the at least one condition triggers the performance of a measurement to be performed in the cell by the wireless device, and the network node 160 configures the wireless device 110 to perform the measurement. In a further particular embodiment, the measurement comprises at least one of an ANR measurement, a positioning measurement, and a cell change measurement.

In a particular embodiment, the network node 160 transmits, to the wireless device 110, a RRC message that triggers or initiates the logging of the information associated with the CE level by the wireless device 110.

Figure 19:
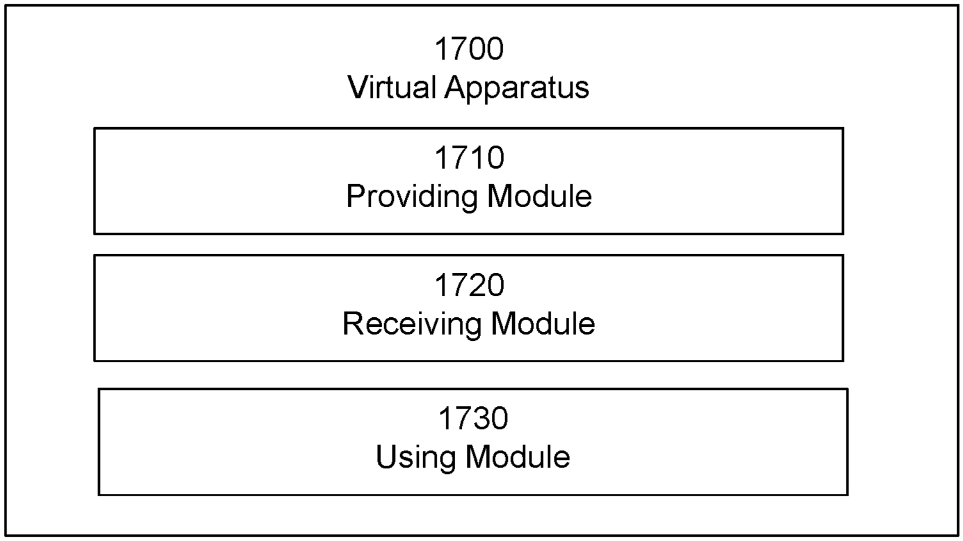
FIG. 19 illustrates another example virtual apparatus, according to certain embodiments.

FIG. 19 illustrates a schematic block diagram of a virtual apparatus 1700 in a wireless network (for example, the wireless network shown in FIG. 1). The apparatus may be implemented in a wireless device or network node (e.g., wireless device 110 or network node 160 shown in FIG. 1). Apparatus 1700 is operable to carry out the example method described with reference to FIG. 18 and possibly any other processes or methods disclosed herein. It is also to be understood that the method of FIG. 18 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause providing module 1710, receiving module 1720, using module 1730, and any other suitable units of apparatus 1700 to perform corresponding functions according one or more embodiments of the present disclosure.

According to certain embodiments, providing module 1710 may perform certain of the providing functions of the apparatus 1700. For example, providing module 1710 may provide a wireless device 110 with a configuration comprising one or more parameters for logging information associated with a CE level.

According to certain embodiments, receiving module 1720 may perform certain of the receiving functions of the apparatus 1700. For example, receiving module 1720 may receive the information associated with the CE level from the wireless device. The received information includes a carrier and a received signal quality and/or a received signal strength measured by the wireless device.

According to certain embodiments, using module 1730 may perform certain of the using functions of the apparatus 1700. For example, using module 1730 may use the information when performing at least one operational task.

ADDITIONAL EXAMPLE EMBODIMENTS

Example Embodiment 1. A wireless device comprising processing circuitry configured to perform any of the methods described above with regard to FIG. 12.

Example Embodiment 2. A computer program comprising instructions which when executed on a computer perform any of the methods described above with regard to FIG. 12.

Example Embodiment 3. A computer program product comprising computer program, the computer program comprising instructions which when executed on a computer perform any of the methods described above with regard to FIG. 12.

Example Embodiment 4. A non-transitory computer readable medium storing instructions which when executed by a computer perform any of the methods described above with regard to FIG. 12.

Example Embodiment 5. A network node comprising processing circuitry configured to perform any of the methods described above with regard to FIG. 16.

Example Embodiment 6. A computer program comprising instructions which when executed on a computer perform any of the methods described above with regard to FIG. 16.

Example Embodiment 7. A computer program product comprising computer program, the computer program comprising instructions which when executed on a computer perform any of the methods described above with regard to FIG. 16.

Example Embodiment 8. A non-transitory computer readable medium storing instructions which when executed by a computer perform any of the methods described above with regard to FIG. 16.

Example Embodiment 9. A wireless device comprising: processing circuitry configured to perform any of the steps described above with regard to FIG. 12; and power supply circuitry configured to supply power to the wireless device.

Example Embodiment 10. A network node comprising: processing circuitry configured to perform any of the steps described above with regard to FIG. 16; power supply circuitry configured to supply power to the wireless device.

Example Embodiment 11. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps described above with regard to FIG. 12; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 12. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps described above with regard to FIG. 16.

Example Embodiment 13. The communication system of the pervious embodiment further including the network node.

Example Embodiment 14. The communication system of the previous 2 embodiments, further including the wireless device, wherein the wireless device is configured to communicate with the network node.

Example Embodiment 15. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 16. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps described above with regard to FIG. 16.

Example Embodiment 17. The method of the previous embodiment, further comprising, at the network node, transmitting the user data.

Example Embodiment 18. The method of the previous 2 embodiments, wherein the user data is provided at the host computer by executing a host application, the method further comprising, at the wireless device, executing a client application associated with the host application.

Example Embodiment 19. A wireless device configured to communicate with a network node, the wireless device comprising a radio interface and processing circuitry configured to performs the of the previous 3 embodiments.

Example Embodiment 20. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps described above with regard to FIG. 12.

Example Embodiment 21. The communication system of the previous embodiment, wherein the cellular network further includes a network node configured to communicate with the wireless device.

Example Embodiment 22. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 23. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps described above with regard to FIG. 12.

Example Embodiment 24. The method of the previous embodiment, further comprising at the wireless device, receiving the user data from the network node.

Example Embodiment 25. A communication system including a host computer comprising: communication interface configured to receive user data originating from a transmission from a wireless device to a network node, wherein the wireless device comprises a radio interface and processing circuitry, the wireless device's processing circuitry configured to perform any of the steps described above with regard to FIG. 12.

Example Embodiment 26. The communication system of the previous embodiment, further including the wireless device.

Example Embodiment 27. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 28. The communication system of the previous 3 embodiments, wherein: the processing circuitry of the host computer is configured to execute a host application; and the wireless device's processing circuitry is configured to execute a client application associated with the host application, thereby providing the user data.

Example Embodiment 29. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 30. A method implemented in a communication system including a host computer, a network node and a wireless device, the method comprising: at the host computer, receiving user data transmitted to the network node from the wireless device, wherein the wireless device performs any of the steps described above with regard to FIG. 12.

Example Embodiment 31. The method of the previous embodiment, further comprising, at the wireless device, providing the user data to the network node.

Example Embodiment 32. The method of the previous 2 embodiments, further comprising: at the wireless device, executing a client application, thereby providing the user data to be transmitted; and at the host computer, executing a host application associated with the client application.

Example Embodiment 33. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 34. A communication system including a host computer comprising a communication interface configured to receive user data originating from a transmission from a wireless device to a network node, wherein the network node comprises a radio interface and processing circuitry, the network node's processing circuitry configured to perform any of the steps described above with regard to FIG. 16.

Example Embodiment 35. The communication system of the previous embodiment further including the network node.

Example Embodiment 36. The communication system of the previous 2 embodiments, further including the wireless device, wherein the wireless device is configured to communicate with the network node.

Example Embodiment 37. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 38. A method implemented in a communication system including a host computer, a network node and a wireless device, the method comprising: at the host computer, receiving, from the base station, user data originating from a transmission which the network node has received from the wireless device, wherein the wireless device performs any of the steps described above with regard to FIG. 12.

Example Embodiment 39. The method of the previous embodiment, further comprising at the network node receiving the user data from the wireless device.

Example Embodiment 40. The method of the previous 2 embodiments, further comprising at the network node, initiating a transmission of the received user data to the host computer.

Example Embodiment 41. The method of any of the previous embodiments, wherein the network node comprises a base station.

Example Embodiment 42. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

| ADDITIONAL INFORMATION: Logging of CE Level for RLF and ANR measurements |
| --- |
| Introduction: At RAN#82, updated Rel-16 work item on Rel-16 enhancements for NB-IoT was approved. See, RP-182902, "Additional enhancements for NB-IoT", Huawei, RAN#82, 10th - 13th December 2018. One of the objectives in this work item is to support SON reporting for random access performance and radio link failure for network management. |
| Network management tool enhancement: SON support for reporting of [RAN2, RAN3] |
| o Cell Global Identity and strongest measured cell(s) (ANR) |
| o Random access performance |
| o Radio link failure (RLF), if needed |
| Below are some of the agreements from RAN2 meetings on Network management tool enhancements. |
| RACH report: |
| ⇒ Initial CEL is included in NB-IoT RACH report. |
| RLF report: |
| ⇒ The following legacy parameters are supported for RLF reporting in NB-IoT: |
| ■ Failed cell ECGI |
| ■ Last Serving Cell RSRP/RSRQ (Whether OK for CP-solution is FFS) |
| ■ Absolute Time Stamp (optional, if available) |
| ■ Location Info (optional, if available) |
| ■ FFS: further information. |
| SON/ANR report: |
| ⇒ For a measured carrier the following information is included: |

In this section, whether it would be appropriate to also include the CE level for the case when RLF happens or for ANR report similar to the RACH report is discussed.

Discussion: A low complexity, power limited UE may operate in different coverage enhancement levels e.g. normal coverage, enhanced coverage etc. The radio resources (e.g. number of repetition of signals, antennas, transmit power etc.) required to serve the UE in different CE levels vary significantly e.g. larger number of repetitions is needed in enhance CE level than in normal CE level. The UE's CE level may also change over time. Therefore, network has to adapt its radio resources for serving different UEs in a cell. It is therefore important for the network to plan and optimize the resources especially at higher load. The low complexity UE (e.g. MTC, NB-IoT etc.) can potentially be located at a location not accessible for an operator to determine for example the resources for allocation e.g. through simple drive tests.

With the current Network management enhancements, it is possible that UE stores the initial CE level while RACH failure happens. In general CE level storage would be useful for RLF and ANR measurements.

Observation 1 The logging of CE level during RLF and ANR measurements will provide better understanding of CE level utilizations and planning of resource requirements.

It is possible to derive the CE level based upon the obtained RSRP. However, CE level is relative and may have changed when the NW does the post processing. UE may perform ANR measurement within 96 hours of receiving the configuration. There may have been change in the CE level. Further, during ANR measurements, if UE has been moving it may have changed the CE level. It should not be additional complexity for the UE to record the CE level and corresponding RSRP.

Proposal 1 UE stores the CE level of the Last Serving Cell for RLF

Proposal 2 UE stores the CE level of serving cell when ANR measurement is being performed.

Proposal 3 UE stores the change of CE level and corresponding RSRPs when ANR measurement is being performed.

In some cases, for ANR, when the strongest cell also becomes candidate for cell reselection, UE may do the ECGI reading after cell reselection. In such case, UE may also store the CE level of the target cell.

Proposal 4 UE stores the CE level of the target cell during ANR measurement when possible.

A specification text proposal follows:

The IE ANR MeasReport NB includes the ANR measurements information.

ANR-MeasReport-NB information element

```
-- ASN1START
ANR-MeasReport-NB-r16 ::=         SEQUENCE {
  servCellIdentity-r16              CellGlobalIdEUTRA
  OPTIONAL,
  measResultCE-LevelList-r16          SEQUENCE (SIZE (1..3)) OF
measResultCE-Level
  measResultCE-Level-r16              SEQUENCE {
          nrsrpResult-r16             NRSRP-Range-NB-r14,
          nrsrqResult-r16             NRSRQ-Range-NB-r14
          ce-Level-r16              INTEGER (0..2)    OPTIONAL
  },
  measResultList-r16                SEQUENCE (SIZE (1..
maxFreqANR-NB-r16)) OF ANR-MeasResult-NB-r16,
  ...
}
ANR-MeasResult-NB-r16 ::=         SEQUENCE {
  carrierFreq-r16                   CarrierFreq-NB-r13,
  physCellId-r16                    PhysCellId         OPTIONAL,
  measResult-r16                    SEQUENCE {
          nrsrpResult-r16             NRSRP-Range-NB-r14,
          nrsrqResult-r16             NRSRQ-Range-NB-r14
  }       OPTIONAL,
  cgi-Info-r16                    SEQUENCE {
          cellGlobalId-r16            CellGlobalIdEUTRA,
          trackingAreaCode-r16        TrackingAreaCode,
          plmn-IdentityList-r16       PLMN-IdentityList2
```

-continued

ANR-MeasReport-NB information element

```
  OPTIONAL,
          ce-Level-r16                INTEGER (0..2)    OPTIONAL
  }       OPTIONAL
}
-- ASN1STOP
```

It is left for future study as to whether a time indication of when the ANR measurements were performed is included in the report, and whether it is a time stamp or a simple indication "immediately after going to IDLE, immediately before going to CONNECTED, in between".

| ANR-MeasReport-NB field descriptions |
|---|
| carrierFreq<br>Indicates the carrier frequency of the reported cell. |
| ce-Level<br>Indicates the CE level of the reported cell. |
| cgi-info<br>Broadcast information of the reported cell. |
| measResult<br>Measured results of the reported cell. |
| measResultList<br>List of measured results for the maximum number of reported carrier frequencies. |
| measResultCE-Level<br>Measured results of the serving cell on a CE Level. |
| plmn-IdentityList<br>The list of PLMN Identity read from the broadcast information of the reported cell. |
| ServingCellIdentity<br>Indicates the cell where the measurement configuration was received. If the field is absent, it is the same as the current serving cell. |

UEInformationResponse-NB

The UEInformationResponse NB message is used by the UE to transfer the information requested by the E-UTRAN.

Signalling radio bearer: SRB1 or SRB1 bits

RLC-SAP: AM

Logical channel: DCCH

Direction: UE to E-UTRAN

UEInformationResponse-NB message

```
-- ASN1START
UEInformationResponse-NB-r16     ::=      SEQUENCE {
  rrc-TransactionIdentifier          RRC-TransactionIdentifier,
  criticalExtensions               CHOICE {
    ueInformationResponse-r16          UEInformationResponse-NB-
r16-IEs,
    criticalExtensionsFuture           SEQUENCE { }
  }
}
UEInformationResponse-NB-r16-IEs ::= SEQUENCE {
  rach-Report-r16                    RACH-Report-NB-r16
  OPTIONAL,
  rlf-Report-r16                     RLF-Report-NB-r16
  OPTIONAL,
  anr-MeasReport-r16                 ANR-MeasReport-NB-r16
  OPTIONAL,
  nonCriticalExtension               SEQUENCE { }
  OPTIONAL
}
RACH-Report-NB-r16 ::=             SEQUENCE {
  numberOfPreamblesSent-r16            INTEGER (1..64),
  contentionDetected-r16               BOOLEAN,
  initialNRSRP-Level-r16               INTEGER (0..2),
  edt-Fallback-r16                   BOOLEAN
}
RLF-Report-NB-r16 ::=             SEQUENCE {
```

-continued

| UEInformationResponse-NB message | |
|---|---|
| failedPCellId-r16 | CellGlobalIdEUTRA, |
| reestablishmentCellId-r16 | CellGlobalIdEUTRA |
| OPTIONAL, | |
| locationInfo-r16 | LocationInfo-r10 |
| OPTIONAL, | |
| measResultLastServCell-r16 | SEQUENCE { |
| nrsrpResult-r16 | NRSRP-Range-NB-r14, |
| nrsrqResult-r16 | NRSRQ-Range-NB-r14 |
| OPTIONAL, | |
| ce-Level-r16 | INTEGER(0..2) |
| OPTIONAL | |
| }, | |
| timeSinceFailure-r16 | TimeSinceFailure-r11 |
| OPTIONAL | |
| } | |
| -- ASN1STOP | |

It is left for future study as to whether the re-establishment cell id is also included in the RLF report for NB-IoT.

| UEInformationResponse-NB field descriptions |
|---|
| anr-MeasReport<br>This field indicates the ANR measurement information. |
| ce-Level<br>This field is used to indicate the ce-Level in which RLF is detected.. |
| contentionDetected<br>This field is used to indicate that contention was detected for at least one of the transmitted preambles, see TS 36.321 [6]. |
| edt-Fallback<br>Value TRUE indicates that EDT fallback indication was received from the lower layers, see TS 36.321 [6]. |
| failedPCellId<br>This field is used to indicate the PCell in which RLF is detected. |
| initialNRSRP-Level<br>Indicates the NRSRP level of the NPRACH resource selected for the first preamble transmission. |
| measResultLastServCell<br>This field refers to the last measurement results taken in the PCell, where radio link failure happened. |
| numberOfPreamblesSent<br>This field is used to indicate the number of RACH preambles that were transmitted. Corresponds to parameter PREAMBLE_TRANSMISSION_COUNTER in TS 36.321 [6]. |
| reestablishmentCellId<br>This field is used to indicate the cell in which the re-establishment attempt was made after connection failure. |
| timeSinceFailure<br>This field is used to indicate the time that elapsed since the connection failure. Value in seconds. The maximum value 172800 means 172800s or longer. |

In conclusion, the following observations were made above:

Observation 1 The logging of CE level during RLF and ANR measurements will provide better understanding of CE level utilizations and planning of resource requirements.

Based on the discussion above, the following is proposed:

Proposal 1 UE stores the CE level of the Last Serving Cell for RLF and the CE levels of serving cell when ANR measurement was being performed.

Proposal 2 UE stores the CE level of the target cell during ANR measurement when possible.

The invention claimed is:

1. A method by a wireless device, the method comprising: when a procedure is triggered or performed, logging information related to a coverage enhancement (CE) level of a cell, wherein the procedure comprises a logging of an Automatic Neighbor Relations (ANR) measurement, and wherein the information comprises:

- an identifier of the CE level and/or CE level change in a cell,
- a carrier, and
- a received signal quality and/or a received signal strength measured by the wireless device; and determining that the wireless device has switched to a higher Radio Resource Control activity state; and in response to determining that the wireless device has switched to a higher Radio Resource Control activity state, transmitting the information related to the CE level to a network node in an ANR report;

selecting a CE level based on a requirement to be fulfilled by the wireless device; and adapting transmitting or receiving parameters, by the wireless device, based on the selected CE level.

2. The method of claim 1, wherein logging the information associated with the CE level comprises periodically determining and logging the CE level of the cell according to a regular time interval.

3. The method of claim 1, wherein the cell is associated with a carrier frequency.

4. The method of claim 1, wherein the information comprises a relative timestamp indicating a time when the information associated with the CE level was logged.

5. The method of claim 1, wherein the received signal quality and/or the received signal strength comprises a Reference Signal Received Quality (RSRQ) and/or a Reference Signal Received Power (RSRP).

6. The method of claim 1, further comprising at least one of:

- determining a requirement to be fulfilled by the wireless device;
- selecting a CE level; and
- adapting at least one transceiver parameter for transmitting and/or receiving signals by the wireless device.

7. The method of claim 1, wherein the information associated with the CE level further comprises at least one of:

- a configured number of CE levels,
- at least one signal level threshold used by the wireless device for deriving the CE level,
- a last CE level determined by the wireless device,
- the CE level in a particular cell,
- a current CE level,
- a target CE level, and
- a relative logging time, Tg, when the information associated with the CE level is logged by the wireless device,
- one or more parameters used by the wireless device for deriving CE level,
- an amount of time spent in a CE level before a CE level change occurred,
- location information when a CE level change occurred,
- a location of the wireless device when the information associated with the CE level is logged;
- a transmission configuration of signals associated with one or more CE levels in the cell; and
- one or more Physical Random Access Channel (PRACH) configuration parameters associated with the CE level determined by the wireless device.

8. The method of claim 1, further comprising:

determining that an event has occurred or at least one condition has been fulfilled; and logging the information associated with the CE level in response to determining that the event has occurred or the at least one condition has been fulfilled, wherein the event or the at least one condition comprises at least one of:

acquiring a cell global identity of the cell;

acquiring system information for performing cell reselection to the cell;

detecting a change in the CE level in a serving cell, a neighboring cell, and/or a strongest cell;

performing a cell reselection procedure from a source cell to a target cell;

receiving a request from a network node, the request indicating that a measurement is to be performed;

detecting a change in a signal level by more than a threshold amount in the cell; and detecting a time expiration.

9. The method of claim 8, wherein the event or the at least one condition triggers the performance of a measurement to be performed in the cell, and the method further comprises performing the measurement, and wherein the measurement comprises the ANR measurement, a positioning measurement, and a cell change measurement.

10. The method of claim 1, further comprising determining that a threshold amount of time has passed, and wherein the information associated with the CE level is transmitted to the network node in response to determining that the threshold amount of time has passed.

11. The method of claim 1, further comprising receiving, from a network node, a configuration for performing the logging of the information associated with the CE level, and wherein logging the information is performed in response to or based on the configuration.

12. The method of claim 1, further comprising receiving, from a network node, a Radio Resource Control (RRC) message that triggers or initiates the logging of the information associated with the CE level by the wireless device, and wherein the logging of the information is performed in response to or based on the RRC message.

13. The method of claim 1, wherein the CE level further comprises at least one of:

a relation between the received signal quality measured by the wireless device and a signal quality threshold, a relation between the received signal strength measured by the wireless device and a signal strength threshold, and an indicator of CE level received from the network node.

14. A wireless device comprising processing circuitry configured to:

when a procedure is triggered or performed, log information related to a coverage enhancement (CE) level of a cell, wherein the procedure comprises a logging of an Automatic Neighbor Relations (ANR) measurement, and wherein the information comprises:

an identifier of the CE level and/or CE level change in a cell, a carrier, and a received signal quality and/or a received signal strength measured by the wireless device; and in response to determining that the wireless device has switched to a higher Radio Resource Control activity state, transmit the information related to the CE level to a network node in ANR report;

selecting a CE level based on a requirement to be fulfilled by the wireless device; and adapting transmitting or receiving parameters, by the wireless device, based on the selected CE level.

* * * * *